(12) United States Patent
van der Laan

(10) Patent No.: US 8,438,126 B2
(45) Date of Patent: May 7, 2013

(54) TARGETED MAXIMUM LIKELIHOOD ESTIMATION

(75) Inventor: Mark van der Laan, Orinda, CA (US)

(73) Assignee: The Regents of the University of California, Oakland, CA (US)

( * ) Notice: Subject to any disclaimer, the term of this patent is extended or adjusted under 35 U.S.C. 154(b) by 1607 days.

(21) Appl. No.: 11/867,364

(22) Filed: Oct. 4, 2007

(65) Prior Publication Data
US 2009/0016470 A1    Jan. 15, 2009

Related U.S. Application Data

(60) Provisional application No. 60/959,499, filed on Jul. 13, 2007.

(51) Int. Cl.
*G06F 17/00* (2006.01)
*G06N 5/02* (2006.01)

(52) U.S. Cl.
USPC .......................................................... 706/46

(58) Field of Classification Search .............. 706/46
See application file for complete search history.

(56) References Cited

U.S. PATENT DOCUMENTS 6,609,094 B1 * 8/2003 Basu et al. ................... 704/240

OTHER PUBLICATIONS

Bembom, Oliver, et al., "Biomarker discovery using targeted maximum likelihood estimation: Application to the treatment of antiretroviral resistant HIV infection", Aquired at: http://works. bepress.com/cgi/viewcontent.cgi?article=1018&context=bembom, 23 pages, 2007.

Yoav Benjamini, et al. "Controlling the False Discovery Rate: A Practical and Powerful Approach to Multiple Testing", Aquired at:// http://www.biostat.jhsph.edu/~yonchen/ controlling%20the%20false%20discovery%20rate.pdf, Journal of the Royal Statistical Society. Series B (Methodological), vol. 57, No. 1. (1995), pp. 289-300. (13 pages).

Scott Hammer, et al., "Treatment for Adult HIV Infection 2006 Recommendations of the International AIDS Society—USA Panel", Aquired at: http://www.iasusa.org/pub/arv_2006.pdf, 2006 American Medical Association., 17 pages.

Leo Breiman, et al., "Random Forests", Machine Learning, 45, 5-32, 2001, Kluwer Academic Publishers. Manufactured in The Netherlands., Aquired at: http://www.cs.colorado.edu/~grudic/teaching/CSCI5622_2004/RandomForests_ML_Journal.pdf, 28 pages.

(Continued)

*Primary Examiner* — Michael B Holmes
(74) *Attorney, Agent, or Firm* — Trellis IP Law Group, PC

(57) ABSTRACT

A method for obtaining an estimator for a distribution pertaining to a dataset is provided. In an illustrative embodiment, the method includes obtaining a dataset; determining a question pertaining to the data; determining an initial estimator descriptive of a distribution of the data; and selectively modifying the initial estimator based on the question, yielding a targeted estimator in response thereto. In a more specific embodiment, selectively modifying the initial estimator includes applying an additional equation and/or a fluctuation function to the initial estimator to yield the targeted estimator, wherein the additional equation or fluctuation function parameter ($\epsilon$) causes the initial estimator to fluctuate or change as a function of the parameter. The fluctuation function is chosen so that when the parameter $\epsilon$ is set to zero, the initial estimator is not fluctuated. The targeted estimator and a fluctuation function may be employed in an accompanying targeted Bayesian method that involves mapping a prior distribution of a target feature to a posterior distribution of the target feature.

28 Claims, 11 Drawing Sheets

OTHER PUBLICATIONS van der Laan, Mark, "Statistical Inference for Variable Importance", The International Journal of Biostatistics, vol. 2, Issue 1, 2006, Article 2, Aquired at: http://www.bepress.com/ijb/vol2/iss1/2/, 33 pages.

van der Laan, Mark, et al., "Targeted Maximum Likelihood Learning", vol. 2, Issue 1, 2006, Article 11, Aquired at http://bepress.com/ucbbiostat/paper213/, 40 pages.

Soo-Yon Rhee, et al., "Genotypic predictors of human immunodeficiency virus type 1 drug resistance" Proceedings of the National Academy of Sciences of the United States of America (PNAS), Oct. 2006, Aquired at: http://hivdb.stanford.edu/pages/pdf/Rhee.PNAS2006.pdf, 7 pages.

Francoise Brun-Vezinet, et al., "Clinically relevant interpretation of genotype for resistance to abacavir" ISSN 0269-9370 & 2003 Lippincott Williams &Wilkins, Aquired at: http://www.hawaii.edu/hivandaids/Clinically_Relevant_Interpretation_of Genotype_for_Resistance_to_Abacavir.pdf, 8 pages.

Bradley Efron, et al., "Least Angle Regression", The Annals of Statistics, vol. 32, No. 2, 407-499 (93 pages) Institute of Mathematical Statistics, 2004, Aquired at: http://www-stat.stanford.edu/~hastie/Papers/LARS/LeastAngle_2002.pdf James Robins, "A New Approach to Casual Interference in Mortality Studies with a Sustained Exposure Period—Application to Control of the Healthy Worker Survivor Effect", Harvard School of Public Health, Mathematical Modeling, vol. 7, pp. 1393-1512 (121 pages), 1986.

James M. Robins, et al., "Identifiability and Exchangeability for Direct and Indirect Effects", 13 pages, 1992.

Robert W. Shafer, et al., "Human immunodeficiency virus type 1 reverse transcriptase and protease mutation search engine for queries", Nature Medicine, vol. 6, No. 11, Nov. 2000, Aquired at: http://hivdb.stanford.edu/pages/pdf/natureMed.pdf, 3 pages.

Sandra E. Sinisi et al., "Deletion/Substitution/Addition Algorithm in Learning with Applications in Genomics" Statistical Applications in Genetics and Molecular Biology, vol. 3, Issue 1, 2004, Article 18, Aquired at: http://www.bepress.com/sagmb/vol3/iss1/art18/, 40 pages.

Leo Breiman, et al., "Classification and regression trees", the Wadsworth statistics/probability series, Wadsworth International Group, 1984, Aquired at: http://www.statsift.com/textbook/stcart.html, 12 pages.

K Van Laethem, et al., "Phenotypic assays and sequencing are less sensitive than point mutation assays for detection of resistance in mixed hiv-1 genotypic populations", Journal of the Aquired Immunodeficency Syndrome, 22 (2):107-118,1999.

PJ Bickel et al., "Inference for Semiparametric Models: Some Questions and Answers", Statistica Sinica 11 (2001), pp. 863-960.

R. D. Gill, "Coarsening at random: characterizations, conjectures and counter-examples", in D.Y. Lin and T.R. Fleming, editors, Proceedings of the first Seattle Symposium in Biostatistics, pp. 255-294, New york, 1997, Springer Verlag.

D. F. Heitjan, et al., "Ignorablilty and Coarse Data", Annals of statistics, 14(4):2244-2253, Dec. 1991.

M. Jacobsen, et al., "Coarsening at Random in General saple spaces and random censoring in continuous time", Annals of Statistics, 23:774-86, 1995.

R. Neugebauer, et al., "Why prefer double robust estimates? Illustration with casual point treatment studies.", Technical Report 115, Division of Biostatistics, University of California, Berkeley, 2002.

W. K. Newey, "Semiparametric Efficient Bounds", Journal of Applied Econometrics, 1(4):335-341, 1995. ISSN 1350-7265.

J. M. Robins, et al., "Comment on the Bickel and Kwon article, Interference for Semiparametric models: Some questions and an answer", Statistica Sinica, 11(4):920-936, 2001.

J. M. Robins, et al., Comment on "On Profile Likelihood", by S. A. Murphy an A. W. van der Vaart. Journal of the American Statistical Association—Theory and Methods, 450:431-435, 2000.

J. M. Robins, Robust estimation in sequentially ignorable missing data and casual inference models. In Proceedings of the American Statistical Association, 2000.

J. M. Robins, et al., "Estimating exposure effects by modeling the expectation of exposure conditional on confounders", Biometrics, 48:479-495, 1992.

J. M. Robins, et al., "Comment on Inference for semiparametric models: some questions and an answer", by Bickel P. J. and Kwon.

J. M. Robins, et al., "Recovery of information and adjustment for dependent censoring using surrogate markers", in AIDS Epidemiology, Methodological issues. Bikhauser, 1992.

Neugebauer, Romain, et al., "Why prefer double robust estimators in causal inference?", Journal of Statistical Planning and Inference, 2005, 22 pages.

P. R. Rosenbaum, et al., "The central role of the propensity score in observational studies for casual effects", Biometrika, 70:41-55, 1983.

S. Sinisi, et al, "The deletion/substitution/addition algorithm in loss function based estimation: Applications in genomics", Journal of Statistical Methods in Molecular Biology, 3(1), 2004.

M. J. van der Laan, "Casual effect models for intention to treat and realistic individualized treatment rules", Technical report 203, Division of Biostatistics, University of California, Berkeley, 2006a.

M. J. van der Laan, "Statistical inference for variable importance. International Journal of Biostatistics", 2(1), 2006ab.

M. J. van der Laan, Identity for npmle in missing data and biased sampling models. Bernoulli, 1(4):335-341, 1995a.

Tsiatis, Anastasioa A., et al., "Covariate adjustment for two-sample treatment comparisons in randomized clinical trials: A principled yet flexible approach", Statistics in Medicine, Copyright 2007 John Wiley & Sons, Ltd., 20 pages.

M. J. van der Laan, "Identity for npmle in censored data models", Lifetime Data Models, 4(0):83-102, 1998.

M. J. van der Laan, et al., "Unified cross-validation methodology for selection among estimators and a general cross-validated adaptive epsilon-net estimator: Finite sample oracle inequalities and examples", Technical report, Division of Biostatistics, University of California, Berkeley, Nov. 2003.

M. J. van der Laan, et al., "Unified Methods for Censored Longitudinal Data and Causality", Springer, New York, 2002.

M. J. van der Laan, et al., "Estimating function based cross-validation and learning", Technical report 180, Division of Biostatistics, University of California, Berkeley, 2005.

M. J. van der Laan, et al., "The cross-validated adaptive epsilon-net estimator", Statistics and Decisions, 2006.

Robinson, Laurence D., et al., "Some Surprising Results about Covariate Adjustment in Logistic Regression Models", International Statistical Review, Aug. 1991, 227-240, 15 pages.

A. W. van der Vaart, et al., "Oracle inequalities for multi-fold cross-validation", Statistics and Decisions, 2006.

Y. Wang, et al., Data adaptive estimation of the treatment specific mean. Journal of Statistical Planning and Inference, 2006.

Z. Yu, et al., "Measuring treatment effects using semiparametric models", Technical Report, Division of Biostatistics, University of California, Berkeley, 2003.

Assmann, Susan F., et al., "Subgroup analysis and other (mis)uses of baseline data in clinical trials", The Lancet, vol. 355, Mar. 25, 2000, 6 pages.

Hernandez, Adrian V., et al., "Covariate adjustment in randomized controlled trials with dichotomous outcomes increases statistical power and reduces sample size requirements", Journal of Clinical Epidemiology, 2004, 454-460, 7 pages.

Robins, James, "A Graphical Approach to the Identification and Estimation of Causal Parameters in Mortality Studies With Sustained Exposure Periods", Journal of Chronic Disease, 139S-161S, 1987, Copyright 1987 Pergamon Journals Ltd., 23 pages.

van der Horst, et al., "Treatment of Cryptococcal Meningitis Associated With the Acquired Immunodeficiency Syndrome", New England Journal of Medicine, vol. 337, No. 1, Copyright 1997 Massachusetts Medical Society, 9 pages.

Randolph, Adrienne G., "Effect of Mechanical Ventilator Weaning Protocols on Respiratory Outcomes in Infants and Children—A Randomized Controlled Trial", Journal of the American Medical Association, Copyright 2002, vol. 288, No. 20, 8 pages.

Pocock, Stuart J., "Subgroup analysis, covariate adjustment and baseline comparisons in clinical trial reporting: current practice and problems", Statistics in Medicine, 2002, 14 pages.

Belda, F. Javier, et al., "Supplemental Perioperative Oxygen and the Risk of Surgical Wound Infection—A Randomized Controlled Trial", Journal of the American Medical Association, Copyright 2005, vol. 294, No. 16, 9 pages.

Frasure-Smith, Nancy, "Randomised trial of home-based psychosocial nursing intervention for patients recovering from myocardial infarction", The Lancet, vol. 350, 473-479, 7 pages.

* cited by examiner

TARGETED MAXIMUM LIKELIHOOD ESTIMATION

CROSS REFERENCE TO RELATED APPLICATIONS

This invention claims priority from U.S. Provisional Patent Application Ser. No. 60/959,499, entitled "Aggregation Analysis for Identifying Digital Content", filed on Jul. 13, 2007, which is hereby incorporated by reference as if set forth in full in this specification.

BACKGROUND

Particular embodiments generally relate to data analysis and more specifically to determining probability distributions or likelihood estimators based on the data and for determining answers to specific questions or features of interest pertaining to the data.

Processes for determining a probability distribution or likelihood estimator descriptive of a given dataset are employed in various demanding applications including analysis of experimental results from scientific studies, determination of probabilities of occurrences of certain events based on observations, and so on. Such applications often demand robust unbiased methods for determining answers to a specific question or feature of interest given a dataset. The dataset may represent experimental results or other observations.

Probability estimation and likelihood estimation are particularly important in biological fields, such as genetics, medicine, and communications systems, where complex problems involving multiple variables are common. Probability estimation often involves employing a probability distribution, also called a probability density function, to determine the probability of occurrence of a certain event or feature. Likelihood estimation involves determining an estimate of a probability distribution, called the density estimator or likelihood estimator based on a predetermined dataset.

Conventionally, global parameters of a distribution, such as the standard deviation and mean of the normal distribution are adjusted to describe the observed data as accurately as possible. Unfortunately, observed data does not always behave according to various well-known distributions. Consequently, such distributions may be particularly inaccurate for certain questions of interest. Thus, accurate estimation of a specified feature of distribution of observed data in large models (e.g., collections of probability distributions that cannot be described by a finite number of parameters) is crucial for the ability to answer questions of interest based on data.

SUMMARY

Certain embodiments provide an apparatus for obtaining a targeted density estimator, also called a targeted maximum likelihood estimator or targeted P-estimator. In a specific embodiment, the apparatus includes an initial estimator module and a targeted estimator module coupled thereto.

In a more specific embodiment, the initial estimator receives as input a dataset and candidate density estimators. An initial density estimator is output by the initial estimator module and input to the targeted estimator module. The targeted estimator module receives as input a mapping function based on a targeted feature. The targeted estimator module includes instructions for determining a targeted estimator that yields an improved estimate of a feature over the estimate of the feature that would be provided via an initial estimator provided by the initial estimator module. Bias may be removed from an initial estimator output by the initial estimator module and provides a targeted estimator as output in response thereto. In one specific embodiment, the targeted estimator solves an efficient influence curve equation or other estimating equation targeting the target feature when substituted therein, thereby improving empirical and/or asymptotic performance of the targeted density estimator as compared to an initial estimator that is output by the initial estimator module.

Hence, this embodiment provides a system for providing an improved targeted estimator of a probability distribution of a dataset for the purposes of determining a target feature result, such as an answer to a question pertaining to the data. By selectively adjusting an initial estimator based on the target feature so that the resulting targeted estimator solves an efficient influence curve equation, or other estimating equation for the target feature, relatively accurate unbiased answers pertaining to the target feature are obtained.

The targeted estimator may then be employed in a targeted Bayesian methodology to facilitate mapping a prior distribution of a target feature to a posterior distribution of the target feature given a dataset.

DESCRIPTION OF EMBODIMENTS

Figure 1:
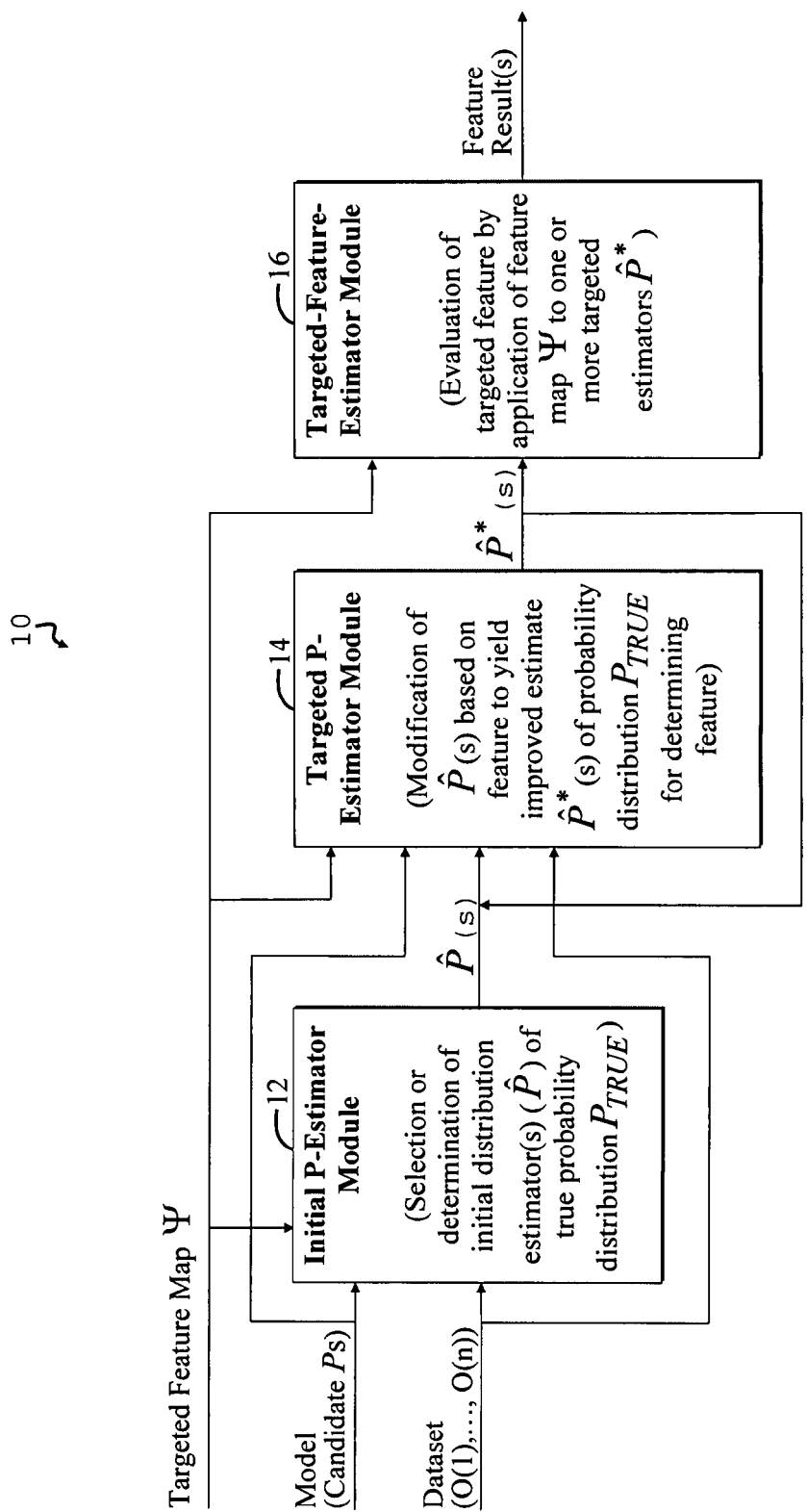
FIG. 1 is a diagram of a first example system for determining a targeted likelihood estimator based on a feature of interest and using the targeted likelihood estimator to determine the feature of interest.

Probability calculations often involve predicting outcomes based on known parameters (e.g. probabilities) or a known probability distribution, while likelihood calculations often involve determining a probability distribution (or parameters, such as probabilities) based on known data. In this case, candidate probability distributions for describing a set of data are called density estimators, likelihood estimators, P-estimators, or estimators of probability distributions. Mathematical descriptions of probability distributions are called probability density functions or simply density functions. A density estimator and density function take similar forms if the density estimator is an accurate estimator of the density function.

A distribution estimator may be any distribution that estimates or approximates a true probability distribution of a dataset or portion or aspect thereof. A true distribution of a dataset may be a distribution that a dataset truly follows or behaves in accordance with. The terms distribution estimator, likelihood estimator, maximum likelihood estimator, density estimator, P-estimator, and estimator of a true probability distribution are employed interchangeably herein.

For the purposes of the present discussion, a density estimator is said to represent a "best fit" to data if the density estimator represents the density estimator that "most" accurately describes the data for a given feature of interest. The concept of "best" can be formalized by the notion that the estimator of the feature of interest is asymptotically efficient. Certain targeted P-estimators discussed herein, under regularity conditions, indeed yield locally asymptotically efficient estimators of the target feature.

Given a model for the true probability distribution of the data, an estimator of a target feature is called asymptotically efficient if the appropriately standardized difference between the estimator and its target feature is asymptotically normally distributed with mean zero and covariance matrix equal to the covariance matrix of the efficient influence curve of the target feature. Given a sub-model (also called working model) of the model, an estimator of a target feature is called locally efficient (with respect to the sub-model) if the estimator is an asymptotically efficient estimator of the target feature and if the true probability distribution is an element of the sub-model. The estimator remains a consistent and asymptotically linear estimation of the true probability distribution as long as the true probability distribution is an element of the model.

Maximum likelihood estimation involves determining a parameter that describes the density estimator making the observed data most probable. Generally, given a set of data, the likelihood of a given density estimator or parameter is equal to or proportional to the probability that the data occurred (e.g., experimental results occurred) given the density estimator or parameter. Hence, the density estimator or parameter with the maximum likelihood represents that density estimator or parameter that is most probable given a set of data, i.e., the density estimator or parameter (e.g., probability) associated with the highest probability of accurately describing the data. For the purposes of the present discussion, a parameter may be any value, function, or a combination of one or more values and/or one or more functions.

Take, for example, a coin-tossing experiment. The binomial random variable describes the probability (P) of obtaining h heads in n tosses of a coin:

$$P = \frac{n!}{h!(n-h)!} p^h (1-p)^{n-h}, \quad [1]$$

where p is the probability (p=0.5) of obtaining heads in a given coin toss. The variable p is also called the parameter for the experiment.

Suppose a coin is tossed 10 times (n=10), and 6 heads (h=6) and 4 tails are observed. This represents a dataset (n=10, h=6). To determine the likelihood that the probability of obtaining 6 heads on a given toss of the coin is 50%, p=0.5 is substituted into equation (1):

$$L = \frac{10!}{6!(4)!} 0.5^6 (0.5)^4 \approx 0.205. \quad [2]$$

Example likelihood values for various values of p are tabulated below:

TABLE 1

| p | L |
|---|---|
| 0.4 | 0.111 |
| 0.5 | 0.205 |
| 0.6 | 0.251 |
| 0.7 | 0.200 |

L is equivalent to the probability that the experimental results were observed given various values of p, i.e., various values of the parameter. Similarly, the maximum likelihood value for L (L=0.251) represents the maximum probability that the experimental results were observed given various values of p, and occurs when p=0.6. The value of p=0.6 is called the maximum likelihood estimate. In this case, the maximum likelihood estimate for p represents the proportion of heads occurring in the experiment, as expected.

When L is plotted as a function of p, it takes a shape with a peak at p=0.6 and L=0.251. When L at the maximum likelihood estimate p=0.6 is plotted as a function of h, it takes the shape of a binomial probability distribution (also called the probability density function of the binomial random variable with p=0.6). The resulting probability distribution is also called the density estimator or maximum likelihood estimator of the true probability distribution (which is binomial with p=0.5).

For the purposes of the present discussion, likelihood values may be any values representative of the likelihood of a given set of data or outcomes given a parameter or model for the data. A log-likelihood may be any logarithm of a likelihood value, such as a base-10 or base-e logarithm (called the natural log). Accordingly, log-likelihood values are also considered to be likelihood values for the purposes of the present discussion.

For clarity, various well-known components, such as power supplies, computer operating systems, user interfaces, and so on have been omitted from the figures. However, those skilled in the art with access to the present teachings will know which components to implement and how to implement them to meet the needs of a given application.

FIG. 1 is a diagram of a first example system 10 for determining a targeted likelihood estimator ($\hat{P}^*$) based on a feature of interest and using the targeted likelihood estimator to determine the feature of interest. System 10 may include a computing device that includes initial P-Estimator Module 12, Targeted P-Estimator Module 14, and Targeted-Feature-Estimator Module 16. The computing device may include a personal computer, workstation, mainframe computer, etc. Also, functions described may be distributed in one or more computing devices.

A feature of interest, also called targeted feature or target feature, may be any information of interest pertaining to a dataset or corresponding probability distribution. A feature generally corresponds to a question pertaining to a dataset.

A targeted feature is said to be targeted, as it is often the objective or target of analysis. For example, the analysis may be concerned with the odds of a patient surviving beyond twenty-eight years after a given treatment. Another example feature may be the effect of a certain gene on the probability of recurrence of a certain type of condition. The later probability distribution may include one or more additional variables pertaining to the effects of the gene. A component of data may be any contributing factor to a dataset, which may include experimental results or observations.

For the purposes of the present discussion, the term "feature of interest" or "target feature" discussed herein may correspond to a value of a scientific parameter, where the scientific parameter is defined by a mapping that is applied to a probability distribution to find a value or result for the target feature. The scientific parameter corresponds to a target feature map $\Psi$. In the present embodiment, the target feature map $\Psi$ is a pathwise differentiable finite dimensional parameter or function of a probability distribution, where the target feature map is well defined over the model or likelihood estimator used to estimate a true probability distribution for a dataset. The pathwise derivative of $\Psi$ applied to the true probability distribution characterizing the dataset corresponds to or is identified by an efficient influence curve at this true probability distribution, as discussed more fully below.

The system 10 for determining a targeted P-estimator (where P stands for Probability distribution) includes an initial P-estimator module 12, a targeted P-estimator module 14, and a targeted-feature-estimator module 16. The initial P-estimator module 12 receives as input a dataset, denoted $\{O(n)\}$, representing n experimental results or observations. The dataset $\{O(n)\}$ includes the following n observations, which are also called data structures: $O(1), \ldots, O(n)$. The dataset is also simply called the data. The dataset is characterized by a true probability distribution ($P_{TRUE}$), which for the purposes of the present discussion is initially unknown for given dataset, but might be known to be an element of a certain specified model, i.e., an element of a set of possible probability distributions of the data.

The initial P-estimator module 12 also receives as input information characterizing a feature of interest, which is the target feature representing the target of analysis performed by the system 10. In the present embodiment, this information is conveyed to the initial P-estimator 12 via a target feature map ($\Psi$). In addition, a set of candidate probability distributions (Ps) comprising a model is input to the initial P-estimator 12. For the purposes of the present discussion, a model may be a set of possible (or candidate) probability distributions, and a given model may include the true probability distribution $P_{TRUE}$.

The candidate probability distributions (Ps) represent candidates of the true probability distribution $P_{TRUE}$ of the dataset, which is the distribution that a dataset actually follows or behaves in accordance with.

The candidate probability distributions (Ps), dataset ($O(1), \ldots, O(n)$), and targeted feature map $\Psi$ are also input to the targeted P-estimator module 14. The targeted feature map $\Psi$ applied to probability distribution P is also denoted $\Psi(P)$, where P is a probability distribution that is mapped by $\Psi$. The feature map $\Psi$ represents a mapping function defined on the model. The feature map $\Psi$ yields the targeted feature when applied to the true probability distribution $P_{TRUE}$, such that $\Psi(P_{TRUE})$ yields the true answer or result, called the true feature result, pertaining to the target feature. The feature result represents an answer to a question sought, wherein the question sought pertains to the target feature.

For an example experiment wherein the information sought is the probability of a patient surviving beyond twenty-eight years after a given medical treatment, $\Psi(P_{TRUE})$ would yield the actual probability of a patient surviving beyond twenty-eight years. This probability corresponds to the area under a curve defined by the density of $P_{TRUE}$ to the right of twenty-eight years, as discussed more fully below.

The feature map $\Psi$, which is sometimes called the targeted parameter mapping, is also input to the targeted-feature-estimator module 16. The targeted-feature-estimator module 16 outputs one or more feature results.

One or more targeted likelihood estimators $\hat{P}^*$ output from the targeted P-estimator module 14 may be input back into the targeted P-estimator module 14 to facilitate iteratively determining one or more preferred targeted likelihood estimators $\hat{P}^*$. Such feedback is employed to implement a K-th step targeted maximum likelihood estimation, which involves iterative updating of the targeted maximum likelihood estimator, as discussed more fully below. K-th step targeted maximum likelihood estimation requires only a finite number of iterations to settle upon a desired targeted maximum likelihood estimator. The iterative updating may include successively optimizing or increasing an empirical criterion, such as the log likelihood of data with respect to a stretching parameter of a stretching function applied to an initial estimator for each iteration of the targeted likelihood estimator. Generally, the stretching function and the empirical criterion are selected so that asymptotic bias is reduced for the target feature at each iteration of the updating of the targeted likelihood estimator, or across a number of such iterations.

The initial P-estimator module 12 includes instructions for selecting, based on one or more predetermined application-specific criteria, one or more initial distribution estimators $\hat{P}$ for estimating the true probability distribution $P_{TRUE}$ that characterizes the dataset. Exact methods for selecting one or more $\hat{P}$s from a given model are application specific. Those skilled in the art with access to the present teachings may readily select an applicable method for selecting one or more $\hat{P}$s without undue experimentation.

An example initial estimator $\hat{P}$, also called the initial P-estimator or initial P-estimator distribution, could be a maximum likelihood estimator according to a working model applicable to a given dataset, such as a normal distribution with estimated mean and variance. For the purposes of the present discussion, a maximum likelihood estimator may be any density estimator used to determine a model, probability distribution, or parameter given a set of data.

The one or more initial estimators $\hat{P}$ are input to the targeted P-estimator module 14. The target P-estimator module 14 includes instructions for modifying the initial estimator $\hat{P}$ based on the target feature, thereby yielding a targeted estimator ($\hat{P}^*$). For the purposes of the present discussion, a targeted estimator may be any density estimator or distribution that is adapted or adjusted based on targeted information sought, i.e., the target feature.

Note that the one or more initial estimators $\hat{P}$ are not necessarily guided by the target feature. In certain embodiments, the one or more initial estimators $\hat{P}$ are primarily concerned with an overall good fit of the true probability density $P_{TRUE}$, where such an overall good fit may be obtained by maximizing a particular empirical criterion, such as a likelihood of data over a set of candidate probability distributions.

The targeted estimator $\hat{P}$ represents a less biased estimate relative to initial estimator $\hat{P}$ for the purposes of determining the feature result sought. Hence, $\Psi(\hat{P}^*)$ will generally yield more accurate results for the target feature than $\Psi(\hat{P})$, such that $\Psi(\hat{P}^*)$ will be closer to $\Psi(P_{TRUE})$ than $\Psi(\hat{P})$ for large enough sample sizes, or on average across repeated experiments. The targeted estimator $\hat{P}^*$ is said to be less biased than the initial estimator $\hat{P}$. In addition, specific embodiments (iterative targeted Maximum Likelihood Estimation (MLE)) of the targeted P-estimators are asymptotically locally (i.e., with respect to user supplied working model) efficient for the model, so that the reduction of bias is done while still extracting all information out of a dataset given the model. It is worth observing that if the target feature represents the whole distribution $P_{TRUE}$, i.e. if $\Psi(P_{TRUE})=P_{TRUE}$, then one expects no improvement.

For the purposes of the present discussion, the bias of an estimator may be the average distance between one or more values estimated by the estimator and the true values. Use of the targeted maximum likelihood estimation as discussed herein reduces asymptotic bias for the target feature under appropriate regularity conditions (i.e., under conditions applicable to many practical applications), where asymptotic bias may be the bias of an estimator of the target feature for a large sample size. Note that a likelihood estimator as discussed need not be less biased for all applications, but may actually be more biased for certain applications without departing from the scope of the present teachings.

However, any estimator of a probability distribution which is asymptotically biased for the target feature may be mapped into an asymptotically unbiased or less biased estimator using the principles discussed herein. For the purposes of the present discussion, the term "epsilon function" may refer to a stretching function that varies as a function of a stretching parameter, such as $\epsilon$. A stretching function may be defined for, i.e., can be applied to any probability distribution in a given model to yield a sub-model. The parameter epsilon ($\epsilon$) may represent merely a collection of possible stretches or fluctuations of a given distribution. The terms "stretching function", "epsilon function", and "fluctuation function" are used interchangeably herein.

A one-step targeted maximum likelihood estimator, which is discussed more fully below, may be defined by applying the stretching function to a density estimator and determining the stretching parameter based on an empirical criterion, thereby yielding the updated one-step targeted estimator. Application of the stretching function to a density estimator may be repeated in certain implementations. Methods involving repetitive or iterative use of a stretching function are called iterative targeted (maximum likelihood) estimation methods, such as the iterative targeted maximum likelihood estimation method discussed more fully below.

A stretching function of the parameter $\epsilon$ can be iteratively applied to any probability distribution estimator (P-estimator), where each step of the iteration includes iteratively maximizing or increasing (or minimizing or decreasing) a particular empirical criteria, such as log likelihood of a dataset, over the stretching parameter $\epsilon$, given the stretching function applied to the current P-estimator. An example of this is an iterative targeted maximum likelihood estimator, wherein the log likelihood of the data is maximized at each iteration to determine the stretching parameter $\epsilon$ to update the P-estimator, thereby obtaining an updated P-estimator. Note that other empirical criteria than the log likelihood may be maximized or increased (or minimized or decreased) at each step of the iteration to determine the stretching parameter epsilon without departing from the scope of the present teachings.

An example targeted P-estimator $\hat{P}^*$ gives the efficient estimate of the area under the curve defined by $P_{TRUE}$ to the right of twenty-eight years, where the targeted feature represents the probability of a patient surviving beyond twenty-eight years after a certain medical treatment. In this case, for each initial estimator $\hat{P}$, the modified density estimator $\hat{P}^*$ represents a best, i.e., efficient fit to the data for the purposes answering the question pertaining to the target feature.

For the purposes of the present discussion, the term "efficiency" refers to a known formal concept in statistical theory. In the present specific example (pertaining to patient survival time), the targeted P-estimator $\hat{P}^*$ indeed yields an efficient estimator of the target feature given the model consisting of all probability distributions.

The targeted P-estimator module 14 is said to exhibit a desired property with respect to the target feature, where in the present embodiment, the property is chosen so that the $\hat{P}^*$ yields an improved estimate of the target feature as compared to the initial estimator $\hat{P}$. An example of such a desired property is that the targeted estimator $\hat{P}^*$ solves an efficient influence curve equation for the target feature. Another global desired property results in a targeted P-estimator $\hat{P}^*$ that exhibits improved overall empirical performance with respect to one or more particular criteria relative to the initial P-estimator $\hat{P}$, such as better overall log-likelihood of the data.

Exact methods for implementing the desired property to modify $\hat{P}$ to yield $\hat{P}^*$ are application specific, and various methods may be used without departing from the scope of the present teachings. Nevertheless, in the present specific embodiment, the targeted P-estimator module 14 includes instructions for implementing a method that includes ensuring that the targeted P-estimator $\hat{P}^*$ solves the efficient influence curve equation when substituted therein or that it solves another empirical equation when substituted therein.

For the purposes of the present discussion, an efficient influence curve may be a mathematical object that identifies a pathwise derivative of a scientific parameter that is a well defined function of any candidate probability distribution P in the model. The scientific parameter discussed in the present embodiment may be any parameter of the probability distribution that is well defined and pathwise differentiable at any candidate probability distribution P in the model. A parameter is said to be non-pathwise differentiable if a curve associated with the parameter is not differentiable, i.e., its derivative does not exist at a given point along the path.

Generally, an efficient influence curve may be a particular transformation of a random variable that captures information present in the data that is relevant to determining the scientific parameter or target feature map $\Psi$ for a given probability distribution, such as $P_{TRUE}$, defined for an applicable model. $\Psi(P_{TRUE})$ is called the target parameter and yields the true feature result.

An efficient influence curve may be defined at each probability distribution in a model that includes a set of one or more candidate probability distributions. The efficient influence curve equation (to be solved in P) implemented by the targeted P-estimator module 14 is given by:

$$0 = D(P)(O(1)) + \ldots + D(P)(O(n)), \quad [3]$$

where P is a candidate modified density estimator, such as $\hat{P}^*$; where D(P), which is an efficient influence curve evaluated at P for the target feature (e.g. $\Psi$), also called the target parameter; and where O(n) represents an n-th observation, where n is an integer; and where D(P)(O(n)) represents D(P) applied to an observation O(n). Formally, the efficient influence curve D(P) at P of the target feature characterizes the derivative at P of the target feature mapping $\Psi$ in the sense that it is the so called canonical gradient of the target feature mapping $\Psi$ at P. This efficient influence curve D($\hat{P}$) at an initial estimator $\hat{P}$ can be used to determine an optimal stretching function to be applied to $\hat{P}$ to yield $\hat{P}^*$ through the iterative targeted MLE process.

The efficient influence curve at the probability distribution P, denoted D(P), may be interpreted heuristically as a curve such that $D(P_{TRUE})$ applied to an observation O is an extraction of this observation O that captures all the relevant information to estimate efficiently the target parameter $\Psi(P_{TRUE})$, i.e., the true answer or result pertaining to the target feature. In one example, the relevant information pertains to patient survival time surpassing twenty-eight.

While in the present specific embodiment, the targeted P-estimator $\hat{P}^*$ solves an efficient influence curve equation when substituted therein, a P-estimator that solves another equation may be employed without departing from the scope of the present teachings. Specifically, let F(P) be an arbitrary function of a probability distribution (P). Instead of solving the efficient influence curve equation, an alternative targeted P-estimator may solve an equation involving the function F(P), where the equation is given by:

$$0 = F(P)(O(1), \ldots, O(n)), \qquad [4]$$

where F(P) is a function of the probability distribution P; P is a candidate modified density estimator, such as $\hat{P}^*$; and where O(n) represents an n-th observation, where n is an integer, and where $F(P)(O(1), \ldots, O(n))$ represents F(P) applied to n observations $O(1), \ldots, O(n)$.

In an example implementation, the targeted P-estimator module 14 implements instructions for applying an additional equation or a fluctuation function (or epsilon function) to the initial density estimator $\hat{P}$ to yield the modified density estimator $\hat{P}^*$. The additional equation or epsilon function is adapted to apply a parametric fluctuation to the initial density estimator $\hat{P}$ to yield a modified density estimator $\hat{P}^*$. Note that $\hat{P}^*$ may be iteratively updated to yield a final $\hat{P}^*$.

In the present specific embodiment, application of the parametric fluctuation to the initial density estimator $\hat{P}$ causes the resulting modified density estimator $\hat{P}(\epsilon)$ (where intermediate estimators $\hat{P}^*$ are also called modified estimators $\hat{P}(\epsilon)$) to be a function of a variable, called epsilon ($\epsilon$), so that the modified density estimator $\hat{P}(\epsilon)$ selectively fluctuates or changes as the parameter $\epsilon$ is changed.

The epsilon function/fluctuation function is chosen so that when $\epsilon$ is set to zero, the updated P-estimator $\hat{P}(\epsilon)$ equals the initial density estimator $\hat{P}$, i.e., $\hat{P}=\hat{P}(\epsilon)$ when $\epsilon=0$. When $\epsilon=0$, the P-estimator $\hat{P}(\epsilon)$ is said to not be fluctuated. The parameter $\epsilon$ may be chosen to maximize or increase (or minimize or decrease) a given empirical criterion, such as the log likelihood of the data. Alternatively, or in addition, the parameter epsilon is chosen so that the resulting updated targeted estimator $\hat{P}^*$ solves an empirical equation, such as an efficient influence curve equation.

In addition, the linear span of the derivative of the empirical criterion (used to determine epsilon in a previous step) at $\hat{P}(\epsilon)$, as a function of the stretching parameter $\epsilon$ at $\epsilon=0$, may be chosen to include the components of $D(\hat{P})(O(1))+ \ldots + D(\hat{P})(O(n))$, where $D(\hat{P})(O(i))$ is an efficient influence curve at $\hat{P}$ evaluated at the i-th observation O(i). In particular, if the empirical criterion is the log likelihood of data under independence of $O(1), \ldots, O(n)$, then the above may be chosen by choosing the parametric fluctuation so that the linear span of the components of the score vector of the parametric fluctuation at $\epsilon=0$ at O(i) includes the linear span of the components of the efficient influence curve $D(\hat{P})(O(i))$ for each of the n observations $i=1, \ldots, n$.

For the purposes of the present discussion, a linear span of components of a score vector may be the linear span of the derivative at $\epsilon=0$ of the log of the function used to modify the initial density estimator, i.e., the log of the parametric fluctuation applied to the initial density estimator to yield the updated density/P-estimator. The parametric fluctuation, which may also be called a parameter, includes or is an epsilon function.

For the purposes of the present discussion, an epsilon function may be any function adapted to selectively modify another function, such as a probability distribution or likelihood estimator. The epsilon function may involve repeatedly/iteratively applying a stretching/fluctuation function to a current P-estimator and empirically determining the stretching parameter. The epsilon function is chosen so that the resulting modified density estimator $\hat{P}^*$ solves an efficient influence curve equation, such as equation (3), when substituted therein. Note that a software routine or other mechanisms that includes instructions for empirically determining the stretching parameter may also be considered part of a mapping defined by an epsilon function.

The resulting targeted likelihood estimator $\hat{P}^*$ maps (through the target feature mapping $\Psi$) into a double robust and/or locally efficient estimator of the target feature under appropriate regularity conditions.

The previous steps describe how to choose a fluctuation function to yield a modified estimator ($\hat{P}(\epsilon)$) as a function of $\epsilon$ so that the derivative of the empirical criterion being the log likelihood of the data $O(1), \ldots, O(n)$, under independence of $O(1), \ldots O(n)$, under $\hat{P}(\epsilon)$ at $\epsilon=0$ equals $D(\hat{P})(O(1))+ \ldots + D(\hat{P})(O(n))$, so that the iterative targeted maximum likelihood estimator $\hat{P}^*$ (e.g., as defined by iteratively applying the stretching function and maximizing or increasing the empirical criterion with respect to the stretching parameter) solves the efficient influence curve equation $0=D(\hat{P}^*)(O(1))+ \ldots + D(\hat{P}^*)(O(n))$.

In general, given an empirical criterion for selecting epsilon, one may choose the fluctuation function so that a linear span of the derivatives of the empirical criterion evaluated at the stretched $\hat{P}^*(\epsilon)$ with respect to $\epsilon$ at $\epsilon=0$ includes the components of a vector function $F(\hat{P})(O(1), \ldots, O(n))$ for a user supplied function F, as defined in equation (4) above.

The resulting modified estimator $\hat{P}^*$, also called the iterative targeted estimator, as defined by iteratively applying the stretching function and maximizing or increasing the empirical criterion with respect to the stretching parameter, will now solve or approximately solve the equation $0=F(\hat{P}^*)(O(1), \ldots, O(n))$ under weak regularity conditions. In this manner, the targeted P-estimator module 14 of FIG. 1 (and its iterative application) includes instructions for computing a $\hat{P}^*$ that solves an estimating equation ($0=F(\hat{P}^*)(O(1), \ldots, O(n))$) aimed at reducing bias for the target feature of interest and that increases an overall fit as measured by the empirical criterion over that of the initial estimator $\hat{P}$. To summarize, the method for determining a stretching function as ingredient of the general iterative targeted estimator can be presented as follows. Given a wished empirical criterion for probability distributions P measuring overall empirical performance of P in approximating $P_{TRUE}$, and given a wished estimating equation $F(P)(O(1), \ldots, O(n))=0$ measuring empirical performance of the target feature of P with respect to true target feature $\Psi(P_{TRUE})$, one constructs a stretching function so that the linear span of the derivative of the empirical criteria at the stretched initial estimator or intermediate estimator with respect to the stretching parameter at zero stretch equals $F(P)(O\_1, \ldots, O\_n)$, with P representing the initial or intermediate estimator.

The modified estimator $\hat{P}^*$ may approximately solve an efficient influence curve equation or may approximately solve another equation (instead of exactly solving the given equation) without departing from the scope of the present teachings. For example, certain implementations/applications may employ an intermediate targeted estimator $\hat{P}^*$ obtained during an iterative maximum likelihood estimation process instead of employing a final estimator that solves an efficient influence curve equation or other equation.

In one specific embodiment, the targeted P-estimator module 14 includes instructions for solving the efficient influence curve equation and increasing the overall log-likelihood over that of the initial estimator $\hat{P}$. This example implementation or construction involves implementing an iteratively targeted maximum likelihood P-estimator, which involves construction of an epsilon fluctuation of the initial P-estimator $\hat{P}$. The construction finds the maximum likelihood estimator of the fluctuation parameter epsilon ($\epsilon$); replaces the initial P-estimator $\hat{P}$ by the corresponding updated P-estimator; and iterates this updating process until a resulting maximum likelihood estimator ($\hat{P}^*$) solves an efficient influence curve equation, such as equation (3). This implementation represents an iteratively targeted maximum likelihood P-estimator, called a "K-th step targeted maximum likelihood estimator for k large enough." In this case, the resulting targeted likelihood estimator $\hat{P}^*$ maps into double robust and/or locally efficient estimator of the target feature under appropriate regularity conditions.

In the previous description of the iterative targeted MLE, one can replace the step involving finding the maximum likelihood estimator of the fluctuation parameter epsilon by other appropriate steps, such as steps further guaranteeing that the updates converge closer to a solution of the efficient influence curve equation, while still increasing the overall likelihood of data. An equation is said to be approximately solved if values on either side of the equal sign are within a predetermined acceptable range of each other, where the predetermined acceptable range is application specific and may vary.

The fluctuation function (or epsilon function) implemented by the targeted P-estimator module 14 may also be called a stretching function, as a fluctuation function is used to selectively stretch, shift, or deform a curve associated with the initial P-estimator $\hat{P}$. A fluctuation function applied to $\hat{P}$ to yield $\hat{P}(\epsilon)$, where that $\hat{P}(e)=\hat{P}$ at $\epsilon=0$ and whose linear span of scores at $\epsilon=0$ includes the components of the (possibly multidimensional) efficient influence curve, can be thought of as optimal stretching function in the sense that a small normalized change in epsilon results in maximal change in the target feature. Incorporation of the fluctuation function into the construction of $\hat{P}^*$ enables stretching of the initial P-estimator and possibly stretching of intermediate updates to obtain a final $\hat{P}^*$ as desired for the purposes of accurately determining the target feature result or answer.

Figure 2:
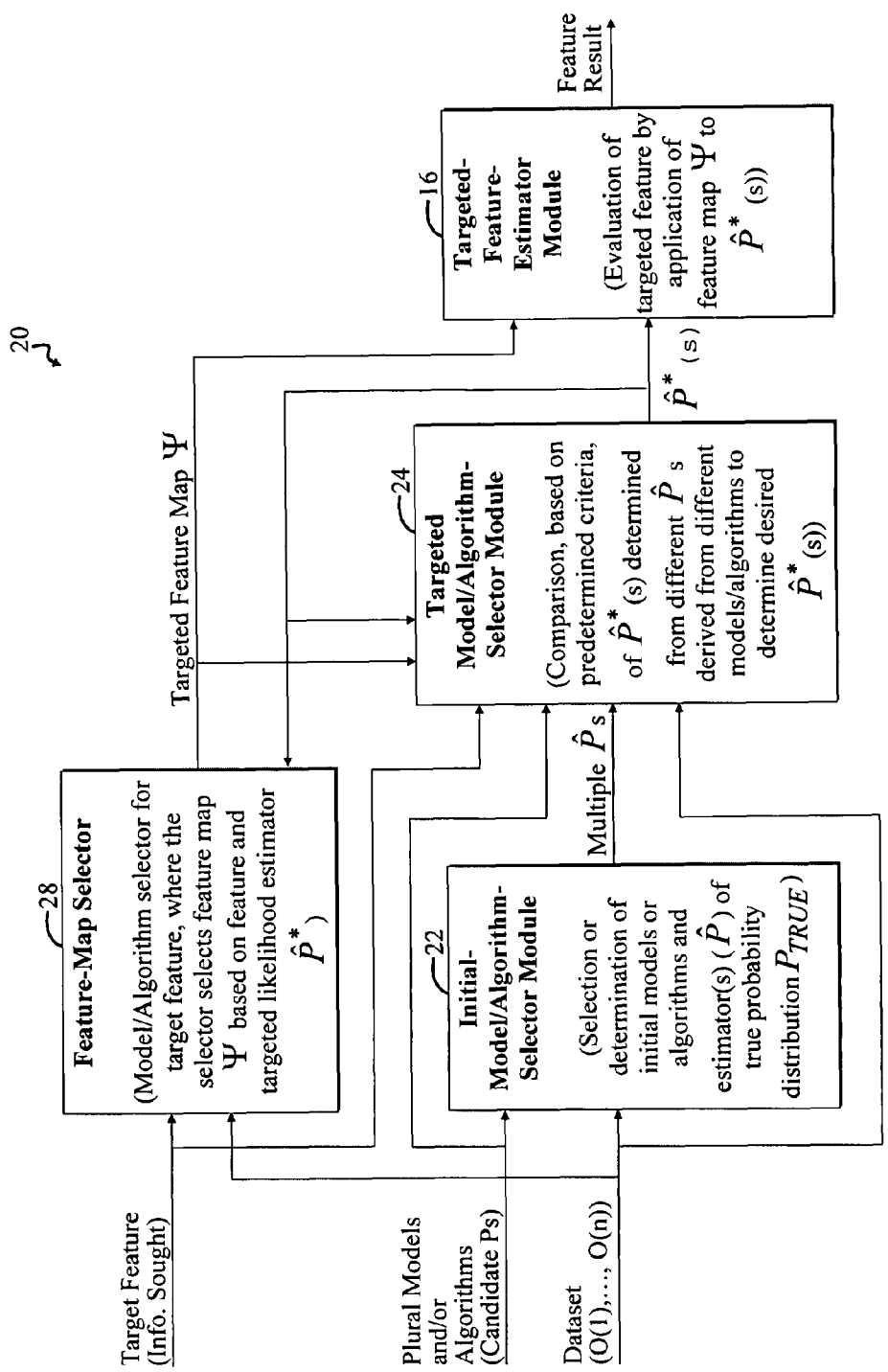
FIG. 2 is a diagram of a second example embodiment for determining a targeted likelihood estimator based on a feature of interest.

In the embodiments discussed herein with respect to FIGS. 1 and 2, the target feature may be representable by a non-pathwise differentiable scientific parameter. In addition, the target feature maps employed thereby may be non-pathwise differentiable feature maps.

Various examples of methods that may be implemented by the targeted P-estimator module 14 are included in the Provisional Patent App. No. 60/959,497, from which the present application claims priority and which is incorporated by reference herein.

The targeted P-estimator module 14 inputs one or more of the modified P-estimators $\hat{P}^*$ into the targeted-feature-estimator module 16. The targeted-feature-estimator module 16 includes instructions for applying the targeted feature map $\Psi$ to each of the modified P-estimators $\hat{P}^*$, yielding corresponding $\Psi(\hat{P}^*)$ values, which represent feature results. A feature result is the result or answer corresponding to the target feature, also called the question sought. The targeted-feature-estimator module 16 also includes instructions for selecting one or more candidate targeted P-estimators $\hat{P}^*$ based on the log likelihood of the targeted P-estimators or other empirical criteria involving likelihood values (i.e., probabilities of observations under a candidate targeted estimator) of the targeted P-estimators. The resulting one or more selected targeted P-estimators $\hat{P}^*$ are used to determine one or more feature results output by the targeted-feature-estimator module 16.

In one example, $\Psi(\hat{P}^*)$ represents the area under the curve defined by the density of $\hat{P}^*$ to the right of twenty-eight years. In this example, for each choice of initial estimator $\hat{P}$, which may include an arbitrarily biased initial estimator, $\Psi(\hat{P}^*)$ yields the efficient and unbiased estimator of the probability of a patient surviving beyond twenty-eight years after undergoing a particular medical treatment, given by the empirical proportion of patients surviving beyond twenty-eight.

Those skilled in the art with access to the present teachings may readily determine a desired feature map $\Psi$ to apply to the modified P-estimator $\hat{P}^*$ without undue experimentation. Similarly, a particular choice of stretching parameter ($\epsilon$) may be selected by maximizing or increasing (or minimizing or decreasing) a certain criterion or criteria. For example, $\epsilon$ may be selected by maximizing or minimizing an empirical criterion, such as the likelihood of the data comprising the dataset. Alternatively, $\epsilon$ may be determined or estimated by solving an empirical equation, such as the efficient influence curve equation.

Certain modules 12-16 of the system 10 may be modified or omitted without departing from the scope of the present teachings. For example, the initial P-estimator module 12 may be omitted in certain embodiments. In such embodiments, the initial estimator $\hat{P}$ is predetermined and is input directly to the targeted P-estimator module 14. Furthermore, the targeted-feature-estimator module 16 may be omitted in certain embodiments. In such embodiments, the targeted estimator $\hat{P}^*$ would represent the output of the system 10.

In summary, the initial P-estimator module 12 may generate many initial P-estimators $\hat{P}$. The targeted P-estimator module 14 then generates one or more targeted P-estimators $\hat{P}^*$ for each candidate initial P-estimator $\hat{P}$. One or more of the targeted P-estimators $\hat{P}^*$ may then be selected by the targeted-feature-estimator module 16 via certain criteria, such as based on the log likelihood of each targeted P-estimator $\hat{P}^*$ The targeted-feature-estimator module 16 then employs the resulting one or more selected targeted P-estimators $\hat{P}^*$ and the target feature map $\Psi$ to evaluate corresponding target features, thereby yielding feature results.

FIG. 2 is a diagram of a second example system 20 for determining a targeted likelihood estimator $\hat{P}^*$ based on a feature of interest, i.e., target feature. FIG. 2 also may include a computing device that performs the functions described herein. The second system 20 includes an initial-model/algorithm-selector module 22, which is coupled to a targeted-model/algorithm-selector model 24. The initial-model/algorithm-selector module 22 receives a dataset ($O(1), \ldots, O(n)$) and plural models/algorithms as input. The plural models each include one or more candidate probability distributions, i.e., candidates of the true probability distribution ($P_{TRUE}$) of the dataset. Instead of employing plural models, the initial model selector module 22 can also take as input candidate algorithms (e.g., different searching strategies for maximizing likelihood over given high dimensional model) for generating candidate initial density estimators when applied to data.

The targeted model/algorithm-selector module 24 also receives a targeted feature map Ψ input from a feature-map selector 28. The targeted-feature-estimator module 16, which is similar to the targeted-feature-estimator module 16 employed in the system 10 of FIG. 1, receives a targeted feature map Ψ input from the feature-map selector 28 and receives as input a modified density estimator ($\hat{P}^*$) from the targeted model-selector module 24.

In operation, the initial-model-selector module 22 includes instructions for selecting or otherwise determining, based on the dataset, a set of initial models or algorithms and accompanying estimators ($\hat{P}$s) of the true probability distribution $P_{TRUE}$ for forwarding to the targeted model-selector module 24. Exact criteria for determining the initial set of models from the plural models input to the initial-model-selector module 22 are application specific. Those skilled in the art with access to the present teachings may readily choose and implement appropriate selection criteria to meet the needs of a given implementation without undue experimentation.

The initial-model/algorithm-selector module 22 inputs multiple initial estimators ($\hat{P}$s), which correspond to different models or algorithms, to the targeted model-selector module 24. The targeted model-selector module 24 implements instructions for calculating and then comparing candidate modified estimators ($\hat{P}^*$s) computed for each of the initial estimators ($\hat{P}$s) to determine a desired modified density estimator $\hat{P}^*$, also called the targeted density estimator. Exact criteria for choosing the preferred targeted density estimator $\hat{P}^*$ are application specific. However, in the present embodiment, the targeted model-selector module 24 employs the dataset, the target feature, and an updated targeted feature map Ψ from the feature-map selector 28 to determine the preferred targeted density estimator $\hat{P}^*$. The targeted density estimator $\hat{P}^*$ is further chosen based on a comparison of likelihood values (i.e., probabilities of observations under $\hat{P}^*$) for each of the candidate modified estimators ($\hat{P}^*$s), wherein the likelihood values are cross-validated, i.e., subjected to cross-validation.

For the purposes of the present discussion, the process of cross-validation may be any process involving partitioning a set of values or parameters into subsets, such that analysis is initially performed on a single subset, while the other subset(s) are retained for use in confirming and validating the initial analysis. The initial subset of values or parameters is called the training set, while the remaining subset(s) is called the validation or testing set.

Hence, the targeted model/algorithm-selector module 24 implements a method for selecting among different candidate targeted estimators ($\hat{P}^*$s) as indexed by different choices of initial density estimators (which themselves are indexed by a model or algorithm choice). The cross-validated (log) likelihood values of the candidate density estimators ($\hat{P}^*$s) can be used to select among different estimators ($\hat{P}^*$s) as indexed by the initial density estimators ($\hat{P}^*$s).

Another general method provides a targeted maximum likelihood estimation learning methodology for estimation of a scientific parameter (corresponding to a target feature) by defining a specified targeted log likelihood loss function and applying a sieve-based estimation methodology in which models and/or algorithms are selected with cross-validation based on the specified targeted log likelihood loss function. Any data-adaptive sieve based maximum likelihood estimation methodology may be generalized to include any data adaptive-sieve based targeted maximum likelihood estimation for estimating the user-supplied scientific parameter. This may be achieved by replacing the log likelihood loss function (e.g., log P) by a new targeted log likelihood loss function (e.g., log P*(P)), where P*(P) is a targeted density update of density P), or equivalently, by replacing likelihood values of data at candidate density P in an empirical criteria for P by the likelihood values of data under the targeted version P*(P) of P.

Hence, each of the candidate targeted P-estimators ($\hat{P}^*$s) can be evaluated with respect to a certain empirical criteria, such as the log-likelihood or cross-validated log-likelihood of the dataset thereby facilitating selecting a preferred targeted P-estimator $\hat{P}^*$ from among candidate targeted P-estimators. For example, one or more predetermined criteria, such as criteria based on log-likelihood or cross-validated log-likelihood, may be maximized or minimized to determine the preferred targeted P-estimator $\hat{P}^*$. For example, the targeted P-estimator $\hat{P}^*$ with the largest cross-validated log likelihood value may be selected.

The log-likelihood or cross-validated log-likelihood of the dataset measures how well a candidate probability distribution fits the true probability distribution $P_{TRUE}$. For the purposes of the present discussion, empirical data may be any data based on experimentation or observation. Similarly, an empirical result may be an experimental or observed result. Empirical functions may be functions computed from experimental or observed results or values.

In selecting the preferred targeted estimator $\hat{P}^*$, the targeted model-selector module 24 effectively implements a process called model or algorithm selection. Model or algorithm selection involves comparing candidate targeted P-estimators ($\hat{P}^*$s), which differ by having relied on different models and/or algorithms. The chosen targeted estimator $\hat{P}^*$ is based on a given model or algorithm associated with the corresponding initial estimator $\hat{P}$. Use of model selection processes may facilitate estimation of non-pathwise differentiable parameters for the targeted feature map Ψ, since such non-pathwise differentiable target features can be approximated by one or more pathwise differentiable model based target features.

In the present example embodiment, the feature-map selector 28 receives the dataset (O(1), . . . , O(n)) and the target feature as input and selects a desired targeted feature map Ψ based on the target feature and the targeted likelihood estimator $\hat{P}^*$(s) output from the targeted model-selector module 24. When evaluating candidate P-estimators ($\hat{P}^*$s), the targeted model-selector module 24 may receive different targeted feature maps (Ψs) based on different targeted P-estimators $\hat{P}^*$ computed thereby.

The feature-map selector 28 includes instructions for selecting a model or algorithm for the target feature and then determining a preferred targeted feature map Ψ based on the selected model or algorithm. Hence, the targeted feature map Ψ output by the feature-map selector 28 represents the selected target feature map corresponding to the selected model or algorithm for the predetermined target feature. The selected feature map preferably provides a relatively accurate approximation of the true target feature originally input to the feature-map selector 28 when the selected feature map is applied to a targeted estimator $\hat{P}^*$.

The feature-map selector 28 is particularly useful for selecting a model or algorithm for a target feature in cases wherein the target feature is not a priori modeled with a parametric model (i.e., the set of possible target features is defined by varying a finite dimensional parameter). In applications wherein a desired parametric model is already known for a target feature, and the feature corresponds to a pathwise differentiable parameter, the feature map pertaining to the known feature is the typical output by the feature-map selector 28.

When the targeted model-selector module 24 settles upon a desired P-estimator $\hat{P}^*$, the targeted-feature-estimator module 16 is activated. The targeted-feature-estimator module 16 then employs the desired P-estimator $\hat{P}^*$ and corresponding targeted feature map Ψ to determine and then output the feature result.

An applicable method may include implementing data adaptive selection of an initial density estimator from among plural initial density estimators, where the initial density estimators are indexed by choices of algorithms or models that are different from an initial model or algorithm of an applicable dataset.

Figure 3:
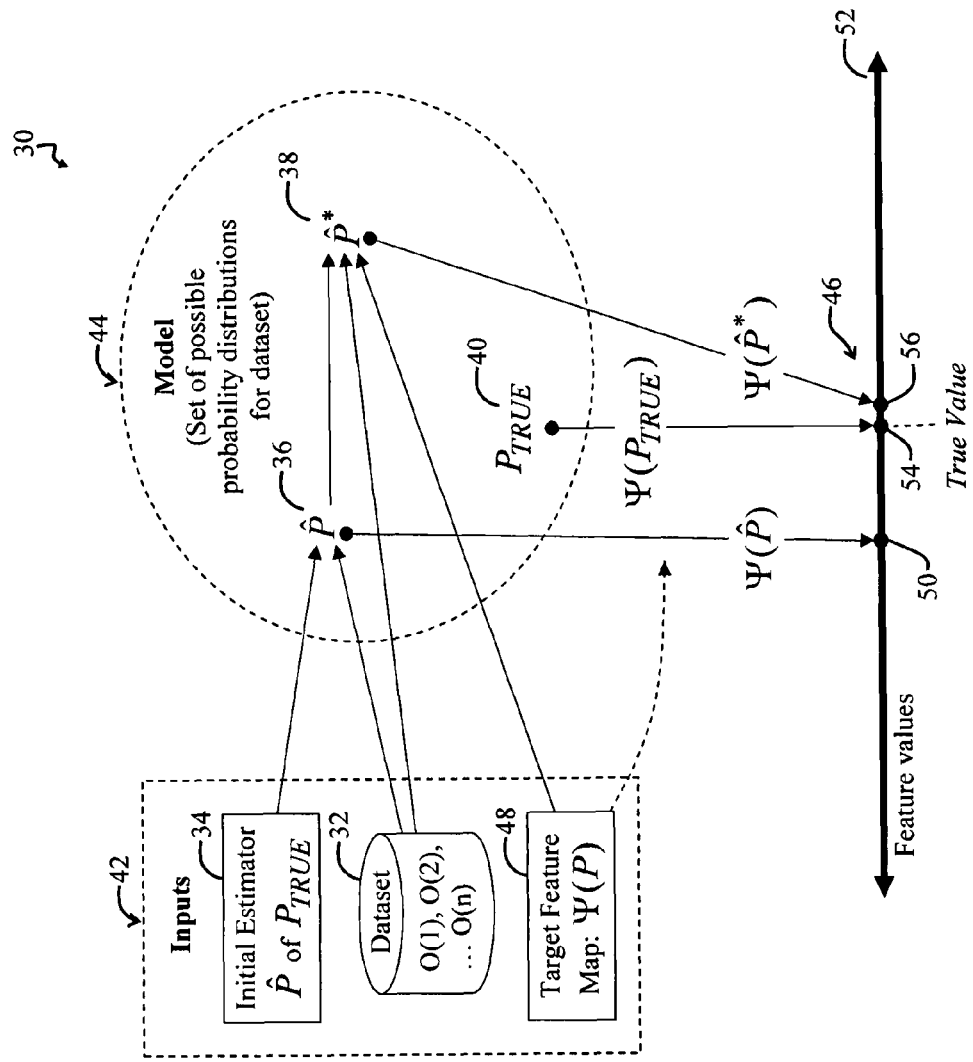
FIG. 3 is a diagram illustrating relationships between example data, an example set of likelihood estimators in a model, and corresponding feature results, and showing that a targeted likelihood estimator provided by the embodiments of FIGS. 1-2 produces one or more improved feature results relative to one or more initial likelihood estimators.

FIG. 3 is a diagram illustrating relationships 30 between inputs 42, target feature results 46, a targeted feature map 48, and likelihood estimators 36 and 38 of a true probability distribution $P_{TRUE}$ given a model 44. The probability distributions 36, 38, 40 represent an example initial likelihood estimator 36 ($\hat{P}$), an example targeted likelihood estimator 38 ($\hat{P}^*$), and an example true probability distribution 40 ($P_{TRUE}$), which are all included in the model 44.

In operation, the initial likelihood estimator 36 ($\hat{P}$) in the model 44 based on the dataset 32 is mapped by Ψ to a first feature value 50, which is shown graphically as a position on a real number line 52.

When the target feature map 48 (Ψ) is applied to the true probability distribution 40 ($P_{TRUE}$) characterizing the dataset 32, the result (Ψ($P_{TRUE}$)) represents the true value 54 or result for the target feature, i.e., represents the correct answer to the question asked or information sought. The true value 54 or true feature result is shown displaced relative to the estimate of the true value 50 resulting from applying Ψ to initial likelihood estimator 36 ($\hat{P}$).

The targeted likelihood estimator 38 ($\hat{P}^*$) is an adjusted version of the initial likelihood estimator 36 ($\hat{P}$), wherein the adjustment may be implemented via an epsilon function or other mechanism. The epsilon function may be based on the dataset 32, the target feature map 48 (Ψ), and the initial likelihood estimator 36 ($\hat{P}$).

When the target feature map 48 (Ψ) is applied to targeted likelihood estimator 38 ($\hat{P}^*$), the resulting targeted value 56 (Ψ($\hat{P}^*$)) is much closer to the true value 54 of the target feature than the initial estimated value 50. Hence, modifications applied to the initial likelihood estimator 36 ($\hat{P}$) to yield the targeted likelihood estimator 38 ($\hat{P}^*$) result in improved accuracy and better results for the target feature. In certain implementations and applications, the resulting targeted estimator (Ψ($\hat{P}^*$)) will be asymptotically unbiased and locally efficient even if the initial P-estimator $\hat{P}$ is extremely biased and inconsistent. In particular, such results are proved in the Provisional Patent App. No. 60/959,499, which is incorporated herein.

The targeted likelihood estimator 38 ($\hat{P}$) is said to yield improved results over that of the initial likelihood estimator 36 ($\hat{P}$) if the targeted estimator 38 ($\hat{P}^*$) maps (through target feature map Ψ) into a locally efficient estimator of the target feature when the initial estimator 36 ($\hat{P}$) did not map into a locally efficient or as locally efficient estimator of the target feature; if the targeted likelihood estimator 38 ($\hat{P}^*$) has reduced asymptotic bias for the target feature or sample bias for the target feature relative to the initial likelihood estimator 36 ($\hat{P}$); if the targeted likelihood estimator 38 ($\hat{P}^*$) can be used to yield feature results that are closer in value to true feature results than would be obtained via initial likelihood estimator 36 ($\hat{P}$); if the targeted likelihood estimator 38 ($\hat{P}^*$) is more robust (e.g. doubly robust) than the initial likelihood estimator 36 ($\hat{P}$); or if the targeted likelihood estimator 38 ($\hat{P}^*$) is otherwise more effective or has more desirable properties for a given use or application.

Figure 4:
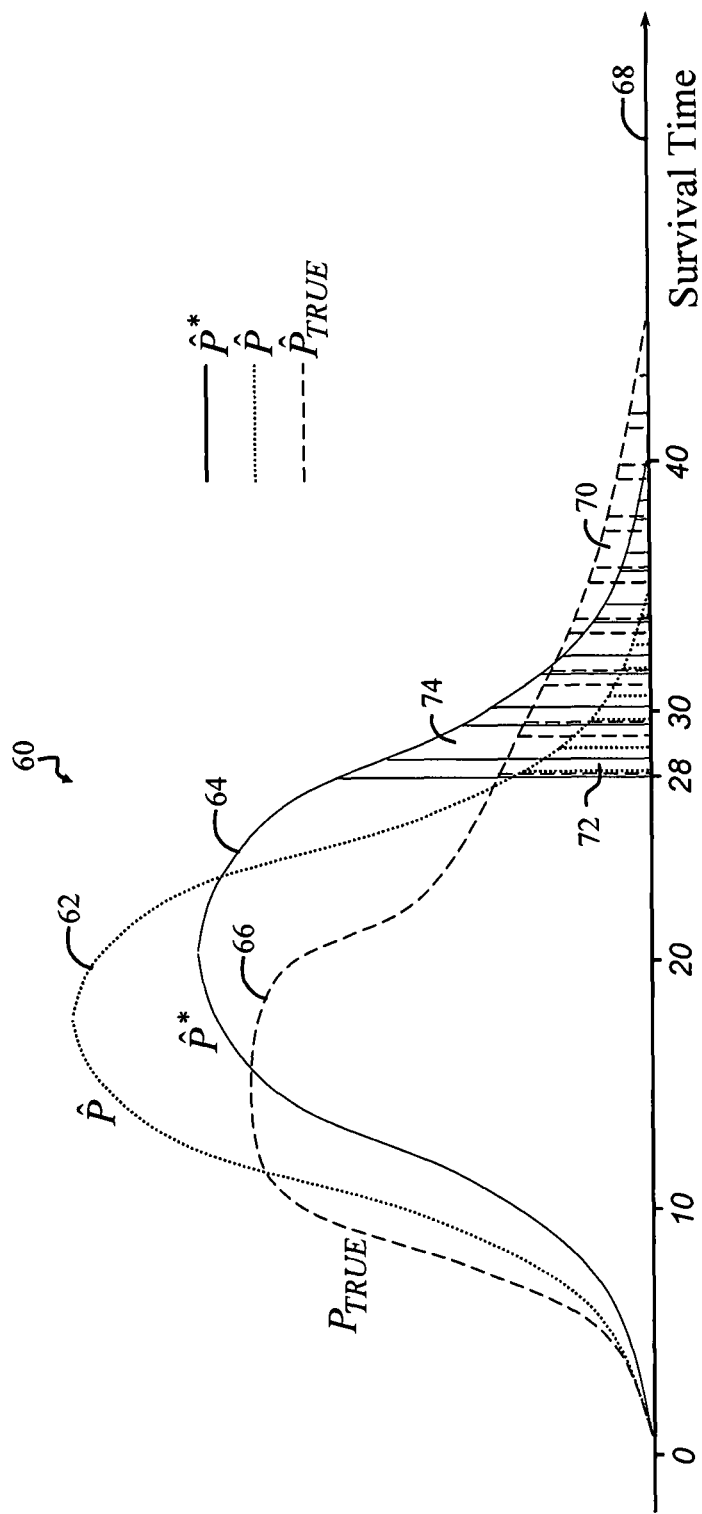
FIG. 4 is a graph illustrating example modifications to an initial likelihood estimator to yield a targeted likelihood estimator, where the targeted likelihood estimator solves the efficient influence curve equation when substituted therein, and estimates the probability of patient survival beyond twenty-eight years.

FIG. 4 is a graph 60 illustrating example modifications to an example initial likelihood estimator $\hat{P}$ to yield an example targeted likelihood estimator ($\hat{P}^*$), where the targeted likelihood estimator $\hat{P}^*$ solves the efficient influence curve equation.

The simple example presented in FIG. 4 is for illustrative purposes. In practice, a stretching process discussed more fully below with respect to FIG. 8 may be employed to selectively modify the initial likelihood estimator $\hat{P}$ to yield the desired targeted likelihood estimator $\hat{P}^*$.

The graph 60 includes an initial curve 62, which is a graphical representation of the example initial likelihood estimator $\hat{P}$; an targeted curve 64, which is a graphical representation of the targeted likelihood estimator $\hat{P}^*$; and a true curve 66, which is a graphical representation of the true probability distribution $P_{TRUE}$ estimated by estimators $\hat{P}$ and $\hat{P}^*$. The graph 60 of FIG. 4 represents an example used to provide a visual illustration of use of the targeted maximum likelihood estimator $\hat{P}^*$ wherein the optimal estimator is $P_{TRUE}$ is known, thereby showing that the targeted maximum likelihood estimator $\hat{P}^*$ succeeds in moving from a very biased initial estimator $\hat{P}$ toward the correct optimal estimator $\hat{P}^*$. Those skilled in the art will appreciate that use of methods discussed herein are applicable to more complicated, truly challenging applications, such as applications in which the density estimators represent densities of high-dimensional random variables.

In this example, the target feature represents the probability that a patient will survive beyond twenty-eight years after a certain medical treatment. The true result or answer pertaining to the target feature represents the actual probability that the patient will survive past twenty-eight years. This feature result is calculated by computing the area under the true curve 66 past twenty-eight years as indicated on a horizontal time axis 68. This area corresponds to a true region 70. This area is computed by taking the integral under the true curve 66 from twenty-eight years to infinity. Hence, the feature map in this example represents an integral of the true probability distribution $P_{TRUE}$ in accordance with the following equation:

$$\Psi(P_{TRUE}) = \int_{28}^{\infty} P_{TRUE}\, dt = \text{true feature result.} \quad [5]$$

Similarly, the estimate of the true feature resulting from use of the initial curve 62 and initial likelihood estimator $\hat{P}$ is computed by determining the area of an initial estimated region 72 under the initial curve 62 to the right of twenty-eight years:

$$\Psi(\hat{P}) = \int_{28}^{\infty} \hat{P}\, dt = \text{initial feature result.} \quad [6]$$

Similarly, the targeted feature result represents the area of a targeted region 74:

$$\Psi(\hat{P}^*) = \int_{28}^{\infty} \hat{P}^*\, dt = \text{targeted feature result.} \quad [7]$$

The targeted curve 64 represents a stretched version of the initial curve 62. In this example, the initial curve 62 is stretched via an additional variable ($\epsilon$) incorporated into the targeted likelihood estimator $\hat{P}^*$ for the purposes of accurately estimating the true feature result, and where the targeted likelihood estimator $\hat{P}^*$ solves the efficient influence curve equation (3).

The initial feature result corresponding to area of the region 72 is significantly smaller than the true feature result corresponding to the area of the region 70. However, the targeted likelihood estimator $\hat{P}^*$ has been modified so that area of the region 74 under the targeted curve 64, which corresponds to the targeted feature result, equals the proportion of patients surviving beyond twenty-eight in this sample, which is known to be the efficient estimator in this simple example. Hence, in applications involving data samples representative of the true probability distribution or for large sample sizes, the area of the region 74 will be close to the area of the region 70. The bias reduction associated with the targeted likelihood estimator $\hat{P}^*$ is achieved with at most relatively small increase in variance relative to the initial likelihood estimator $\hat{P}$. The variance associated with the target feature of $\hat{P}^*$ is still known to correspond with an efficient estimator of the target feature (because $\hat{P}^*$ solves the efficient influence curve equation), which extracts all the information from data relevant for survival beyond twenty-eight years.

Figure 5:
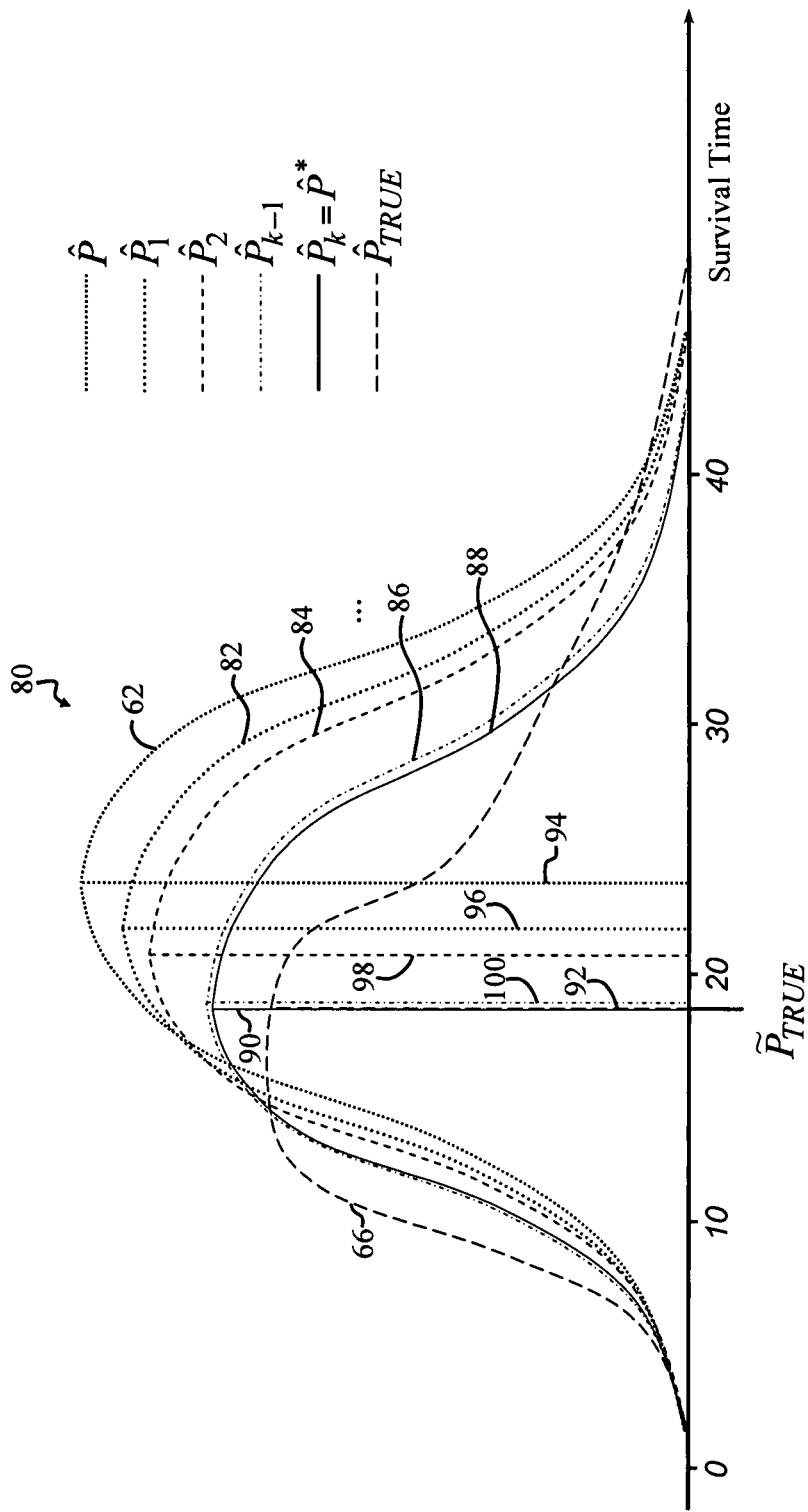
FIG. 5 is a graph illustrating iterative stretching of an initial likelihood estimator to yield a targeted likelihood estimator that solves an efficient influence curve equation and estimates a median of a true distribution of a dataset.

FIG. 5 is a graph 80 illustrating iterative stretching of an initial likelihood estimator $\hat{P}$ to yield a targeted likelihood estimator $\hat{P}^*$ that solves an efficient influence curve equation and estimates efficiently a median of a true distribution of a dataset. The example of FIG. 5 represents a simplified version of a stretching/ripping process used to estimate a median, which is discussed more fully below with respect to FIG. 9.

The graph 80 depicts results of an iterative approach to determining the targeted likelihood estimator $\hat{P}^*$. The graph 80 of FIG. 5 represents an example used to provide a visual illustration of use of the targeted maximum likelihood estimator $\hat{P}^*$ wherein the optimal estimator is $P_{TRUE}$ is known, thereby showing that the targeted maximum likelihood estimator $\hat{P}^*$ succeeds in moving from a very biased initial estimator $\hat{P}$ toward the correct optimal estimator $\hat{P}^*$. Those skilled in the art will appreciate that use of methods discussed herein are applicable to more complicated, truly challenging applications, such as applications in which the density estimators represent densities of high-dimensional random variables.

An example iterative approach includes identifying a strategy for stretching an estimator (e.g. $\hat{P}$) so that a small stretch yields a maximum change in the target feature relative to a normalized change in stretch. This is achieved by constructing a path $\hat{P}(\epsilon)$ as a function of the free parameter epsilon ($\epsilon$), where $\hat{P}(0)$ equals the estimator $\hat{P}$, and the score of $\hat{P}(\epsilon)$ at $\epsilon=0$ equals an efficient influence curve evaluated at $\hat{P}$. The graph 80 of FIG. 5 is based on a similar underlying experiment and dataset as the graph 60 of FIG. 4, i.e., the experiment involving survival times of patients after a certain treatment.

A particular strategy for determining the amount of stretch is to estimate it with maximum likelihood estimation, which is associated with an epsilon value of $\epsilon_{nPT}$. This amount of stretch is applied to $\hat{P}$ via the stretching function, which yields a first-step targeted maximum likelihood estimator $\hat{P}_1$ or simply the first-step estimator.

In the graph 80, the initial curve 62 is a graphical representation of the initial estimator $\hat{P}$. After a first iteration, the initial curve 62 is stretched to a first targeted curve 82, which represents the first-step targeted maximum likelihood estimator $\hat{P}_1$.

The first-step estimator $\hat{P}_1$ can then be substituted for $\hat{P}$ in the above process to produce a second-step estimator $\hat{P}_2$, corresponding to a second targeted curve 84, and so on. For illustrative purposes, a $(k-1)^{th}$ targeted curve 86 and a $k^{th}$ targeted curve 88 are also shown. The $k^{th}$ curve 88 represents the targeted maximum likelihood estimator $\hat{P}^*$.

Hence, the process continues until the incremental stretch or change in curves represented by successive estimates $\hat{P}_{k-1}$ and $\hat{P}_k$ is approximately zero, as shown by the relatively small difference or "stretch" between the $(k-1)^{th}$ targeted curve 86 and a $k^{th}$ targeted curve 88.

The last probability distribution ($k^{th}$ targeted curve 88) represents the targeted likelihood estimator $\hat{P}^*$, which solves (up to a user supplied numerical precision) the efficient influence curve equation (3), thereby achieving the desired bias reduction with at most a relatively small increase in likelihood relative to the initial $\hat{P}$. Although in many applications, convergence such that $\hat{P}_k \approx \hat{P}_{k+1}$ occurs in one step, in this median example, the iteration might be necessary to obtain the solution of the efficient influence curve equation. However, typically most bias reduction occurs in the first few steps. This general process is called the iterative targeted maximum likelihood estimation.

Note that a $k^{th}$ median 90 of the $k^{th}$ targeted curve 88 equals the empirical median, which is known to be an efficient estimator of the true median 92 of the true probability distribution $\hat{P}_{TRUE}$. The asymptotic bias of the median estimators 94-100 of the curves 62, 82-86 becomes successively closer to zero with each iteration.

Figure 6:
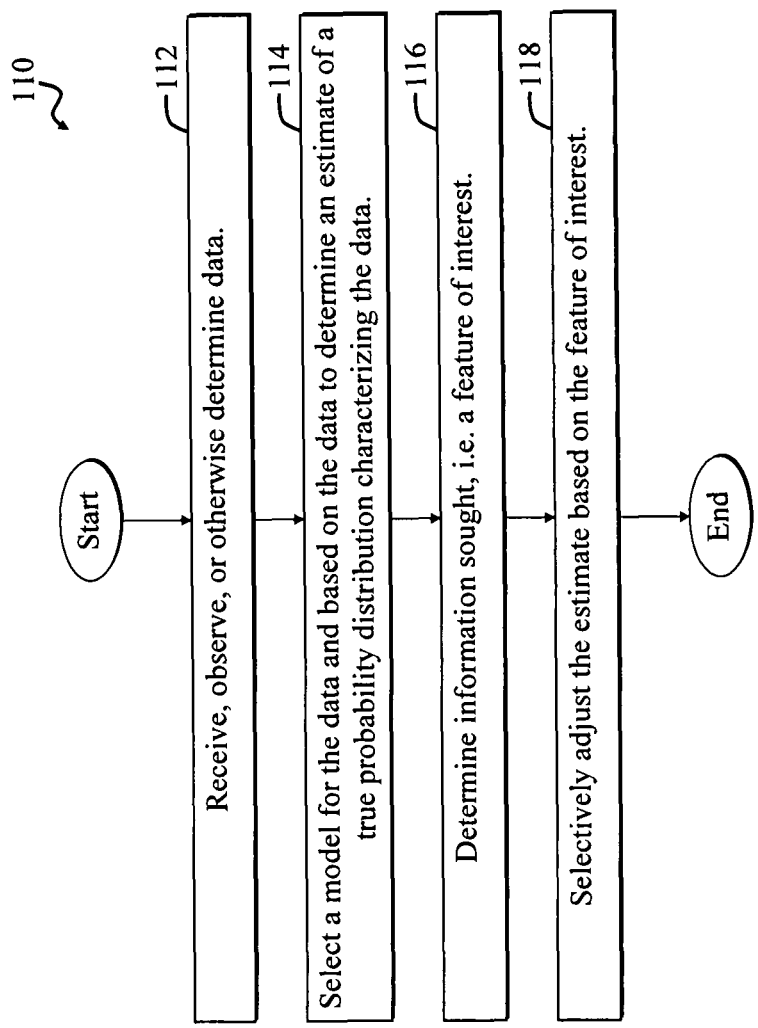
FIG. 6. is a flow diagram of a first method suitable for use with the systems of FIGS. 1 and 2.

FIG. 6 is a flow diagram of a first method 110 suitable for use with the systems 10, 20 of FIGS. 1 and 2. The method 120 includes a first step 112, which includes receiving, observing, or determining a dataset. For the purposes of the present discussion, a dataset may be any collection of one or more observations, results, or values.

A second step 114 includes selecting a model for the dataset to determine an estimate of a true probability distribution characterizing the data.

A third step 116 includes determining information sought from the dataset, where the information sought is called a target feature. Note that the target feature need not be determined from the dataset, i.e., decisions pertaining to choices of target features need not be informed by the dataset.

A fourth step 118 includes adjusting the estimate of the true probability distribution based on the target feature.

Those skilled in the art will appreciate that the various steps 112-118 may be altered, reordered, or augmented without departing from the scope of the present teachings. For example, the determination of the target feature performed in the third step 116 may occur before the model for the dataset is selected in the second step 114. As another example, the method may be altered to include a loop to implement iteration so that the estimate of the true probability distribution is adjusted and readjusted based on the previous adjustment, as discussed with respect to FIG. 5.

A general method involves creating a sub-model of stretched versions of an initial estimator, which have been stretched by an epsilon function. A selected value for $\epsilon$ of the epsilon function is then determined by maximizing or minimizing or increasing or decreasing an empirical criterion. The derivative of the empirical criterion with respect to $\epsilon$ spans a predetermined function (e.g. $F(P)(O(1), \ldots, O(n))$ as given in equation (4). The predetermined function may be user supplied. An intermediate modified estimator, which is stretched via an epsilon function with an intermediate desired value for $\epsilon$ inserted therein, is then treated as an initial estimator in the above process. The process is iterated or repeated until the predetermined function, with values for the targeted estimator inserted therein, solves or approximately solves a predetermined equation, such as equation (3) or (4) above. This represents an alternative iterative targeted method for obtaining a targeted estimator from an initial estimator. Note that the entire mapping, which includes iteration and selection of the parameter $\epsilon$ and which employs the sub-model, is also considered to be a type of epsilon function, as is the stretching function used to create the sub-model of stretched estimators. In a specific example implementation, the predetermined equation to be solved is given by:

$$F(\hat{P})(O(1), \ldots, O(n)))) = \sum_i D(\hat{P})(O(i)),$$

where $D(\hat{P})$ is an efficient influence curve at $\hat{P}$, and where the remaining terms are as given above.

Figure 7:
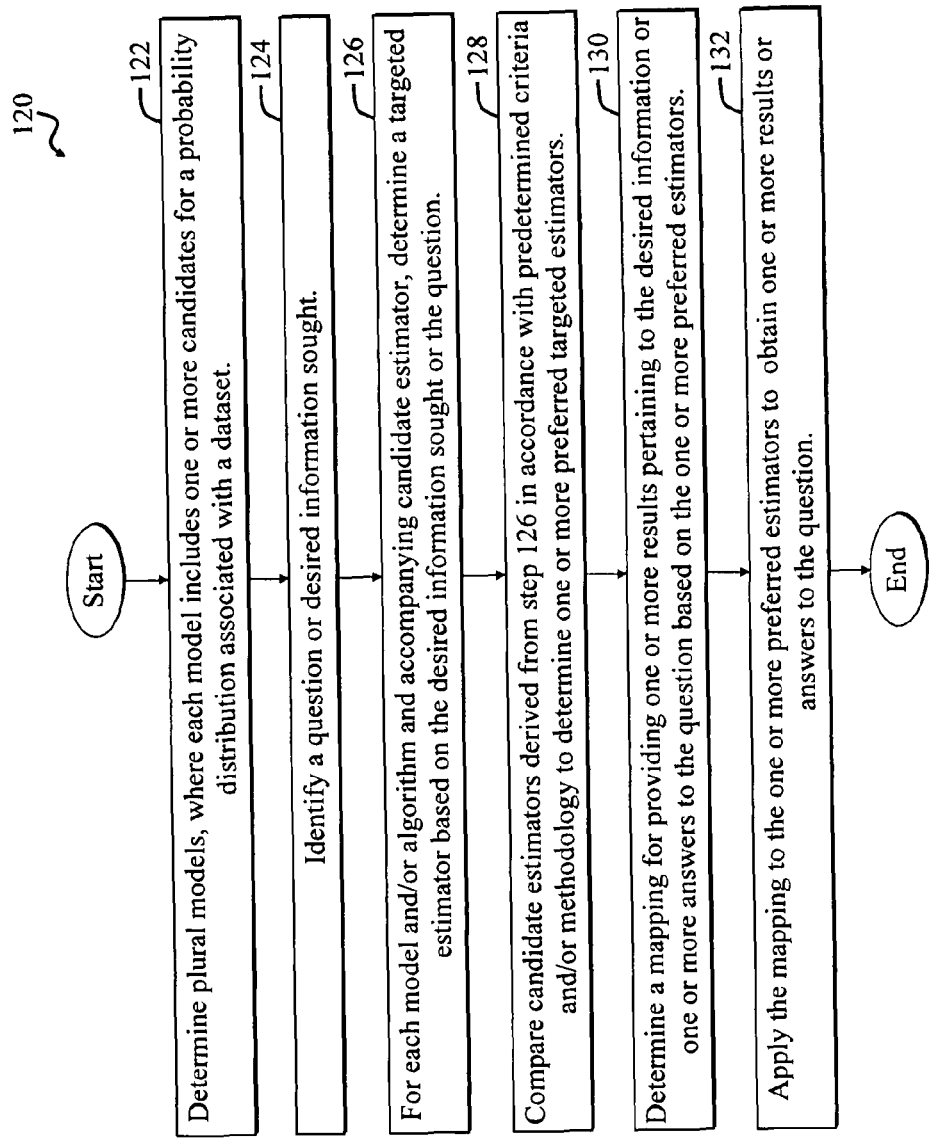
FIG. 7 is a flow diagram of a second method suitable for use with the systems of FIGS. 1 and 2.

FIG. 7 is a flow diagram of a second method 120 suitable for use with the systems 10, 20 of FIGS. 1 and 2. The second method 120 includes an initial step 122, which includes determining multiple models/algorithms for a dataset, where each model or algorithm implies a candidate estimator for a true probability distribution characterizing the dataset.

A subsequent feature-determining step 124 includes identifying a question or desired information sought, i.e., determining the target feature, which is not necessarily based on the dataset. The feature-determining step 124 may correspond with selecting a target feature map $\Psi$.

Next, a targeted-estimator-calculation step 126 includes determining targeted estimators based on each candidate estimator for each model and/or algorithm and based on the target feature.

A subsequent comparison step 128 includes comparing the candidate targeted estimators derived from step 126 in accordance with a predetermined criteria and/or methodology to determine one or more preferred estimators.

Next, a map-determination step 130 includes determining a mapping used to determine one or more results pertaining to the target feature based on the one or more preferred estimators. The map-determination step 130 may include determining a modeled version of a targeted feature, such as a dose response family of curves. For example, determining a modeled version of a target feature might involve considering only linear and quadratic dose response curves, wherein the model for the target feature is selected based on data. Note that the target feature can itself be an unspecified function, such as an unspecified dose response curve so that the target feature mapping is not a pathwise differentiable parameter. Note that selection of a targeted feature map need not be based on a dataset.

A subsequent application step 132 includes applying the mapping to the one or more preferred estimators to obtain one or more results or answers pertaining to the target feature.

Those skilled in the art will appreciate that the various steps 122-132 may be altered, reordered, or augmented without departing from the scope of the present teachings. For example, in certain implementations, the mapping step 130 and the application step 132 may be omitted. In another example embodiment, the comparison step 128 may include selecting a single preferred estimator by selecting a corresponding model or algorithm used to determine the candidate estimator upon which the preferred estimator is based.

In a particular embodiment, the desired value of epsilon is set equal to the solution of an equation defined by setting the empirical mean of the efficient influence curve to zero at the parametric fluctuation of the initial density estimator, i.e., when the parametric fluctuation of the initial density estimator (i.e., $\hat{P}(\epsilon)$) is inserted therein. Steps include determining the efficient influence curve at the parametric fluctuation; setting the empirical mean of the efficient influence curve to zero; and solving the resulting equation in epsilon.

Similarly, another embodiment involves setting the desired value of $\epsilon$ equal to the solution of an equation defined by setting a pre-specified function $F(\hat{P}(\epsilon))(O(1), \ldots, O(n))$ equal to zero (as in equation (4)) at the parametric fluctuation of the initial density estimator $\hat{P}$, i.e., at $\hat{P}(\epsilon)$. The predetermined function is analogous to the efficient influence curve. Steps include determining the $F(\hat{P}(\epsilon))(O(1), \ldots, O(n))$ at the parametric fluctuation; setting $F(\hat{P}(\epsilon))(O(1), \ldots, O(n))$ equal to zero; and solving the resulting equation in $\epsilon$.

Furthermore, a targeted maximum likelihood estimation process may be used to obtain targeted estimates of a nuisance parameter of an efficient influence curve for the target feature, or in general, to obtain a targeted estimate of a nuisance parameter of a general function $F(P_{TRUE})$ for the target feature. A version of the efficient influence curve (or general function) that incorporates the targeted maximum likelihood estimator of the nuisance parameter may then be used to determine a desired targeted maximum likelihood estimator of the target feature. A particular example of this method applies to censored data models (and thereby causal inference, including handling time-dependent covariate processes). The example method involves also iteratively updating/targeting the fit of a censoring mechanism (i.e., the nuisance parameter), beyond the iteratively updating/targeting of the fit of the other factor of the likelihood describing the full/uncensored data distribution, so that the Inverse Probability of Censoring Weighted (IPCW) Estimator (with the updated censoring mechanism) equals the targeted maximum likelihood estimator, where the targeted maximum likelihood estimator equals the Double Robust IPCW estimator. This collapses several estimators (IPCW, DR-IPCW, and MLE) into a new (iterative) targeted likelihood estimator.

Certain embodiments and concepts discussed herein are applicable to non-pathwise differentiable scientific parameters and/or pathwise differentiable scientific parameters. This extension allows model selection between candidate parametric models for the non-pathwise differentiable parameter, such as discussed with respect to FIG. 2.

While certain embodiments are discussed herein with reference to an efficient influence curve equation, embodiments of the present invention are not limited thereto. For example, certain embodiments may update an initial estimator based on a target feature to yield a targeted estimator that solves another equation other than the efficient influence curve. Suitable alternatives to the efficient influence curve equation may include certain double robust estimating equations for the target feature and the inverse probability of censoring weighted versions of certain double robust estimating equations for the target feature. In such alternative implementations, asymptotic properties (such as asymptotic consistency, asymptotic rate of convergence, asymptotic linearity and normality, robustness, and asymptotic unbiasedness) of a targeted maximum likelihood estimator may be similar to asymptotic properties of estimators derived from solving efficient influence curve estimating equations.

Figure 8:
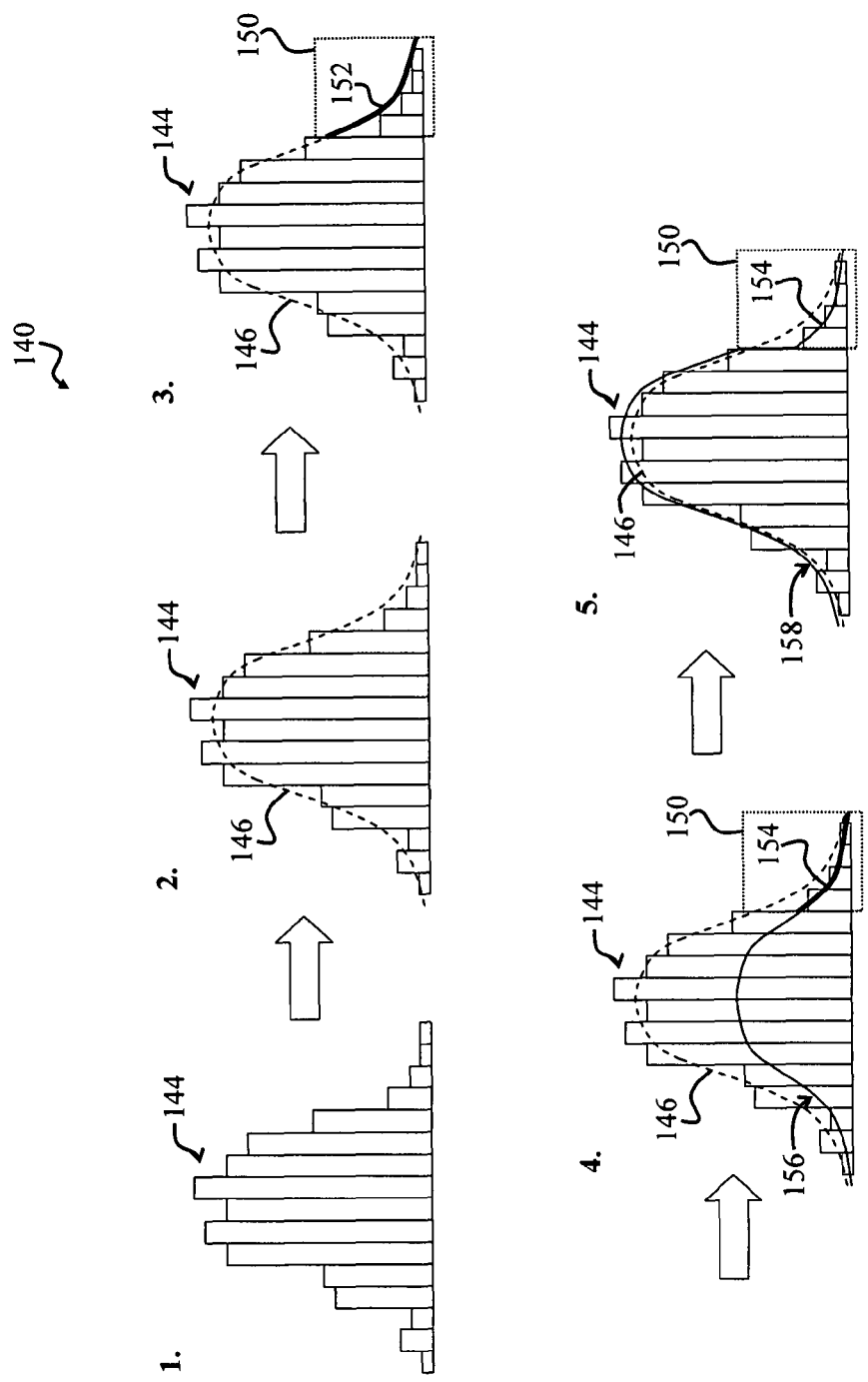
FIG. 8 illustrates exemplary stages in an example targeted maximum likelihood process applicable to the example of FIG. 4.

FIG. 8 illustrates exemplary stages (1-5) in an example targeted maximum likelihood process 140, which is applicable to the example of FIG. 4. A first stage involves determining or otherwise obtaining a dataset 144, which is depicted as a distribution, also called the empirical distribution.

A subsequent second stage involves determining an initial density estimator 146 based on the dataset 144. The initial density estimator 146 is chosen to best describe the entire dataset 144. The term "best describe" may be application specific. Initial density estimators that do not best describe the initial dataset 144 for certain purposes may be employed without departing from the scope of the present teachings. However, in general, the area under the initial density estimator 146 will be normalized to equal one.

A third stage involves identifying a target feature of the dataset. In the present example, the target feature is within an example boxed-in portion 150 of the distribution 144. The target feature of the dataset 144 represents a question to be answered, and the feature result represents the answer to the question.

For illustrative purposes, the initial density estimator 146 is shown biased high (152) for the desired target feature. Consequently, the feature result is likely to be wrong.

A fourth stage involves stretching the initial estimator 146 to yield a first modified estimator 156. The first modified estimator 156 is obtained by multiplying the initial density estimator 146 by a number that eliminates bias for the target feature. A corresponding targeted portion 154 of the first modified estimator 156 is relevant to the example target feature, and occurs within the boxed-in portion 150. The targeted portion 154 represents a first portion of a second modified density estimator 158, which is called the targeted density estimator in the present example.

A fifth stage involves determining the remaining portion of the targeted density estimator 158 from the first modified density estimator 156. In this example, the portion of the first modified density estimator 156 outside of the boxed-in section 150 is multiplied by a number that makes the area under the entire curve 158 equal to the area under the entire initial estimator 146, which is equal to one.

While the present example targeted maximum likelihood process 140 is a relatively simple example, nevertheless, the process 140 is suitable to provide visual illustrations of a targeted maximum likelihood estimation process. Similar methods can be applied to very complex problems, such as causal effect analysis for longitudinal data structures, variable importance analysis, and the handling of censored and missing data.

The targeted maximum likelihood process 140, which may also be called a "rip and stretch" method, optimizes bias reduction with a minimal increase in variance. Note that other stretching mechanisms or methods may be used without departing from the scope of the present teachings.

The likelihood of the targeted maximum likelihood density estimator may provide an objective and targeted (toward a target feature) criterion for data-adaptive model selection for any given stretching mechanism. A targeted maximum likelihood estimate is obtained, in many applications, after only one stretch (or rip and stretch) adjustment, where the amount of stretch is determined with the maximum likelihood estimation. However, in general, to obtain the targeted maximum likelihood estimator, iteration is employed, wherein the output of one step becomes the input to the next. Such iterative methods represent K-th step targeted maximum likelihood estimation.

Figure 9:
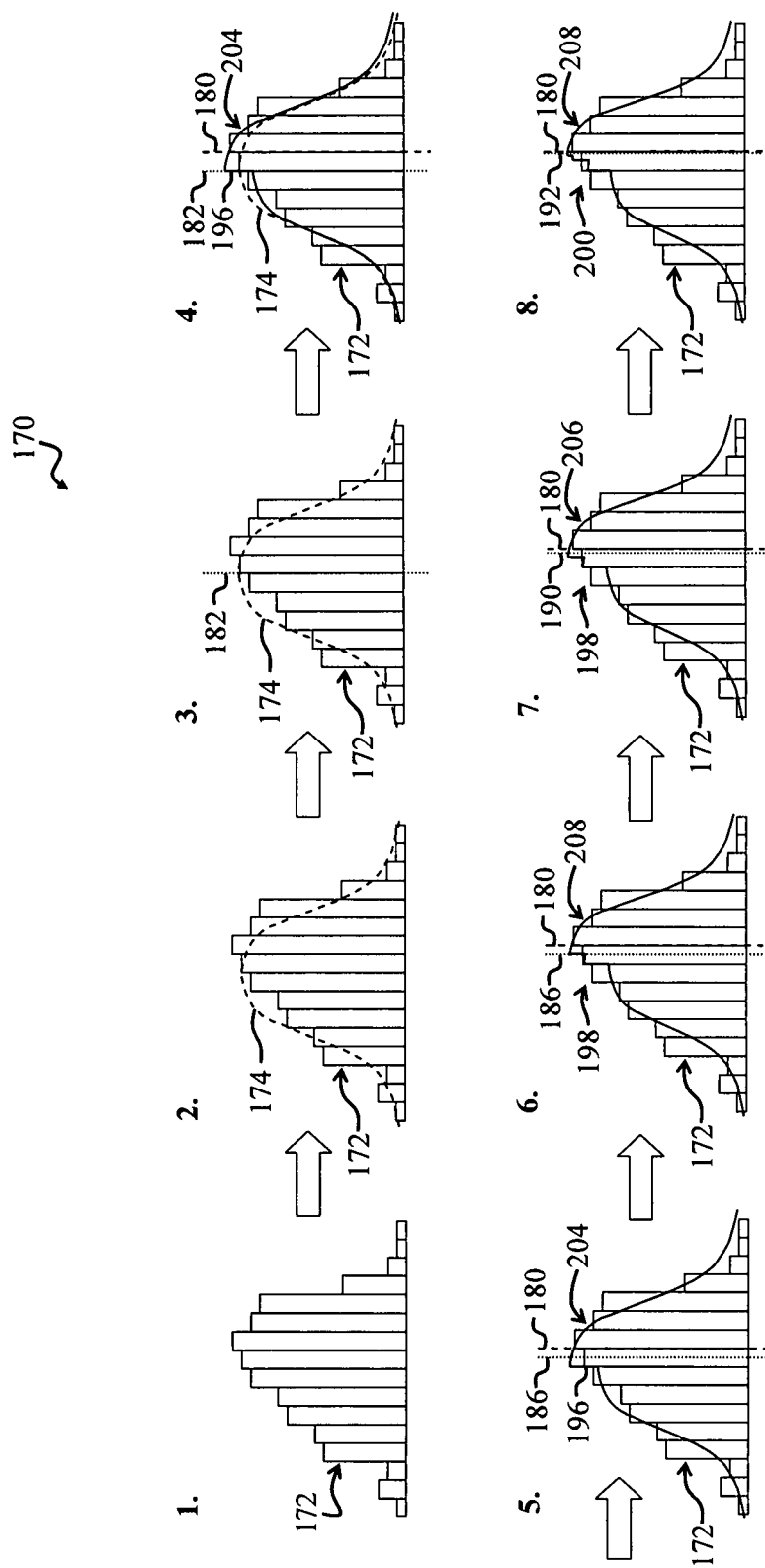
FIG. 9 illustrates exemplary stages in an example iterative K-th step targeted maximum likelihood process applicable to the example of FIG. 5.

FIG. 9 illustrates exemplary stages (1-8) in an example iterative K-th step targeted maximum likelihood process 170, which is applicable to the example of FIG. 5. The process 170 includes determining or otherwise obtaining an initial dataset 172, which for illustrative purposes is depicted as a histogram.

A second stage includes determining an initial density estimator 174 that is fit to the initial dataset 172 so that the area under the initial density estimator 174 is equal to one. Exact details for fitting an initial density estimator to a dataset are application specific, and various methods may be readily employed by those skilled in the art with access to the present teachings without undue experimentation.

A third stage involves determining a first estimated median 182 of the initial dataset 172 based on the initial density estimator 174. However, the initial density estimator 174 is biased, i.e., is different from the empirical median 180 of the dataset 172. The first estimated median 182 corresponds to the line that splits the area under the initial density estimator 174 so that area under the initial density estimator 174 to the left of the first estimated median 182 is equal to the area under the initial density estimator 174 to the right of the first estimated median 182.

A fourth stage involves "ripping and stretching" the initial density estimator 174 to reduce bias for the target feature, i.e., the true median 180 of the dataset 172. The resulting ripped and stretched density estimator represents a first modified density estimator 204, which includes a jump 196 at the first estimated median 182. The first modified density estimator 204 is stretched by a predetermined amount, while ensuring that the area under the first modified density estimator 204 is equal to the area under the initial density estimator 174.

A fifth stage involves repeating the "ripping and stretching" process to reduce bias for the target feature (the median in the present example), but applying the process to the first modified density estimator 204 rather than to the initial density estimator 174. The first modified density estimator 204 is characterized by a second estimated median 186. The first modified density estimator 204 is ripped and stretched at the second estimated median 186, which results in a second modified estimator 206, which is illustrated in the sixth stage. In the sixth stage, the second modified estimator 206 is shown characterized by a double step 198.

Subsequently, a seventh stage includes determining the median of the second modified estimator 206, which represents a third estimated median 190. The second modified estimator 206 is then ripped and stretched at the third estimated median 190 to reduce bias, yielding a third modified estimator 208 in the eighth stage.

The third modified estimator 208 is characterized by a median 192 that is approximately equal to the median of the dataset 172, which represents the target feature. The third modified estimator 208 is also characterized by a triple step 202.

Hence, the process of ripping and stretching to reduce bias for the target feature is iterated a desired number of times to obtain a desired estimator for the target feature. In the present illustrative example, the desired targeted likelihood estimator is presented by the third modified estimator 208.

The targeted maximum likelihood methodology can also be applied to the world of Bayesian analysis. Generally, Bayesian analysis starts with a model for a dataset. The model includes a probability distribution for certain unknown parameters in the model. The probability distribution is called a "prior distribution" or simply a "prior". Bayesian analysis then seeks the conditional distribution of these parameters given the observed data. The conditional distribution is also called the "posterior distribution" or the "posterior".

Targeted empirical Bayesian methodology discussed herein, also called targeted Bayesian learning, employs general Bayesian methodology, since it involves determining a posterior distribution from a prior distribution. However, in the present example embodiment, Bayesian analysis is applied to a model corresponding to a targeted parameter of interest, i.e., to a target feature. The model for this target feature includes a supplied targeted density estimator and a stretching function to be applied to it. The targeted density estimator may be arrived at independently of Bayesian analysis. The stretching function to be applied to the targeted density estimator may be the same one used to initially construct the targeted density estimator, but this is not necessary.

Treating the targeted density estimator as a given, the stretching parameter becomes the only unknown parameter. A model of one or more distributions describing a dataset, also called distributions of data, can be determined based on one or more values of the stretching parameter ($\epsilon$). One can now map a user-supplied prior distribution of the target parameter of interest to a prior distribution of $\epsilon$. The posterior probability distribution of $\epsilon$ (i.e., given the dataset) can be calculated based on the model, the prior probability distribution of $\epsilon$, and the conditional distribution of the dataset given $\epsilon$ (as described by the model) via application of Bayes formula. This posterior distribution of $\epsilon$ implies a posterior distribution of the target feature (represented by a parameter $\psi$) such that the posterior distribution of $\psi$ is readily obtainable from the posterior distribution of $\epsilon$, such as via a mapping. One skilled in the art with access to the present teachings may readily determine this mapping without undue experimentation. Note that similarly, a distribution of $\epsilon$ implies a distribution of $\psi$ through the mapping $\epsilon \rightarrow \psi(\hat{P}(\epsilon))$ Thus, targeted empirical Bayesian learning as discussed herein involves mapping a prior distribution of the target parameter (also called the target feature $\psi$) into a posterior distribution of the target parameter $\psi$, as discussed more fully below.

The resulting posterior distribution of the target parameter allows one to calculate probabilities concerning the parameter of interest, i.e., target feature $\psi$. The center, i.e., median/mean, of this posterior distribution will be close to that of the target feature of the targeted density estimator. Moreover, the stretching function can be selected so that the posterior distribution will show the asymptotically correct or conservative spread for the target feature. In particular, this latter statement can be arranged to hold by assuming that the stretching function applied to the targeted density estimator, i.e., $\hat{P}(\epsilon)$, has a score at $\epsilon=0$ equal to the efficient influence curve, i.e., by employing an optimal stretching function. The fact that the targeted density estimator is data dependent can then be safely ignored.

Note that conventional Bayesian analysis is subject to greater bias than the targeted Bayesian analysis discussed herein, as conventional Bayesian analysis is not targeted, but instead focuses on obtaining a posterior distribution for the whole data generating distribution.

Figure 10:
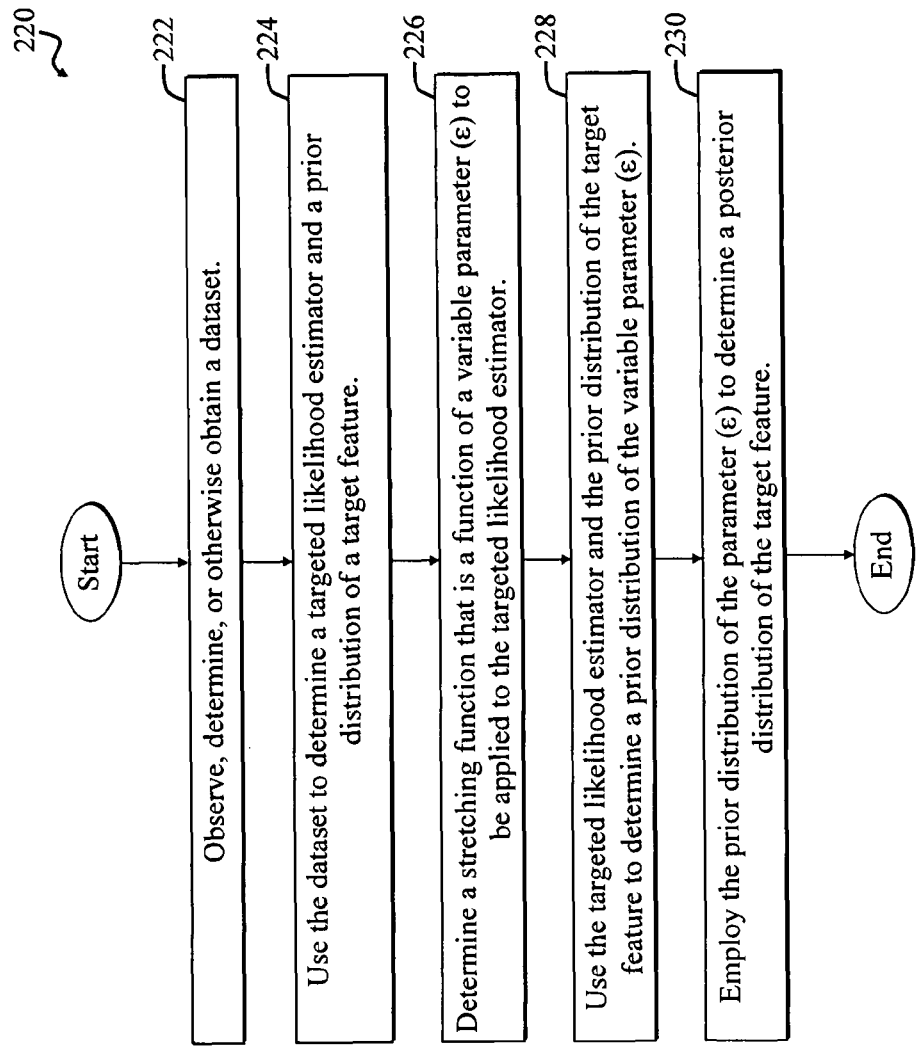
FIG. 10 is a flow diagram of first example method for implementing a targeted Bayesian maximum likelihood process.

FIG. 10 is a flow diagram of a method for implementing a targeted Bayesian maximum likelihood process that employs a targeted maximum likelihood estimator for the purposes of mapping a prior of the target feature into a posterior distribution.

For the purposes of the present discussion, a prior distribution may be any distribution, such as but not limited to a probability density function or estimator, used to determine a posterior distribution. A posterior distribution may be any distribution that is conditional such that the distribution is determined based on given information, such as data or parameters, or otherwise based on one or more predetermined assumptions.

The method 220 includes a first step 222 that involves observing, determining, or otherwise obtaining a dataset.

Subsequently, a second step 224 includes using the dataset to determine a targeted likelihood estimator and a prior distribution of a target feature, wherein the target feature is represented by a parameter ($\psi$) of interest. To determine the targeted likelihood estimator, also simply called the targeted estimator, an initial estimator may be determined from which the targeted estimator is then determined based on one or more methods discussed herein. For example, the targeted estimator may be determined by applying an epsilon function to an initial estimator to selectively modify the initial estimator (e.g., by iteratively applying a fluctuation function to current P-estimator; empirically determining the stretching parameter; and computing the corresponding updated P-estimator) thereby yielding the targeted estimator.

Subsequently, a third step 226 includes determining a fluctuation function, such as a stretching function, which is a function of a parameter ($\epsilon$). Note that in certain implementations, the fluctuation function will be similar to the fluctuation function used to determine the targeted estimator from the initial estimator. However, the fluctuation function, which is also said to be a function of $\epsilon$, may be a different function than that used to obtain the targeted estimator.

Next, a fourth step 228 includes using the targeted likelihood estimator and the prior distribution of the target feature ($\psi$) to determine a prior distribution of the variable parameter $\epsilon$. A prior distribution of $\epsilon$ can be derived from the prior distribution of the target feature $\psi$ and vice versa—the prior distribution of the target feature $\psi$, i.e., the parameter of interest, can be determined from a prior distribution of $\epsilon$. Note that a mirror distribution of a set $\{E\}$ of values of $\epsilon$ may be mapped to a prior distribution of the target feature $\psi$, i.e., to $\Psi(\hat{P}(\epsilon))$: $\epsilon \in E$. Hence, a distribution of the target feature $\psi$ is implied by a model that includes the target feature mapping $\psi$, a distribution of $\epsilon$, and stretched versions (stretched via different values of $\epsilon$) of the targeted estimator $\hat{P}^*$ determined by holding $\hat{P}^*$ fixed and letting $\epsilon$ vary. Thus, given a prior distribution of $\psi$, the prior distribution of $\epsilon$ is chosen so that the resulting distribution of $\psi$ equals this prior distribution of $\psi$, and given, for example, a posterior distribution of $\epsilon$, the posterior distribution of $\psi$ is determined.

A fifth step 230 includes using the prior distribution of $\epsilon$ as the prior distribution for Bayesian analysis used to determine a first posterior distribution of $\epsilon$. The first posterior distribution of $\epsilon$ represents a conditional density given the dataset. The first posterior distribution of $\epsilon$ is determined from the prior distribution of $\epsilon$, treating the targeted estimator $\hat{P}^*$ as fixed; letting $\epsilon$ vary as the only unknown parameter; and applying Bayes formula.

The first posterior distribution of $\epsilon$ is then used to determine a targeted posterior distribution (second posterior distribution) of the target feature $\psi$ given the dataset, as described above. In particular, the posterior distribution of $\epsilon$, the target feature map $\Psi$, and a targeted distribution (targeted estimator) are used to determine the posterior distribution of the target feature $\psi$, which is a conditional distribution given the dataset, i.e., is a distribution that is conditional on the dataset. The targeted posterior distribution of the target feature represents the output resulting from an example process that implements the method 220.

Note that one or more of the steps 222-230 of the method 220 may be altered, omitted, or rearranged without departing from the scope of the present teachings. In addition, additional steps may be added. For example, method 220 may be modified to implement iteration, which is especially useful when a targeted estimator is not employed in the method 220. For example, one can use the posterior distribution of $\epsilon$ as calculated in step 230 above to compute a new targeted estimator $\hat{P}^*(\epsilon)$ for step 224, with $\hat{P}^*$ denoting the original targeted estimator and $\epsilon$ denoting the posterior mean of $\epsilon$, and then repeat steps 226-230 with this new targeted estimator. That is, steps 224-228 may be repeated as needed before the second posterior distribution is determined.

An example variation of the method 220 includes obtaining a probability distribution, called the prior distribution, of a target feature. For one or more unknown parameters in a model, wherein the model includes a targeted density estimator and a stretching function, wherein the stretching function is (or is a function of) an initially unknown parameter ($\epsilon$), the method includes determining a sub-model of data distributions that depend on values of parameter ($\epsilon$). The posterior distribution of the target feature is then determined based on the sub-model and the prior distribution of the target feature, treating the targeted density estimator as fixed, i.e., non-random such that the fact that the targeted density estimator is based on data is ignored.

A specific embodiment of targeted Bayesian estimation is presented in Provisional Patent Application Ser. No. 60/959,499, which is incorporated by reference herein, and presents the empirical Bayesian analogue of the iterative targeted maximum likelihood estimator.

Figure 11:
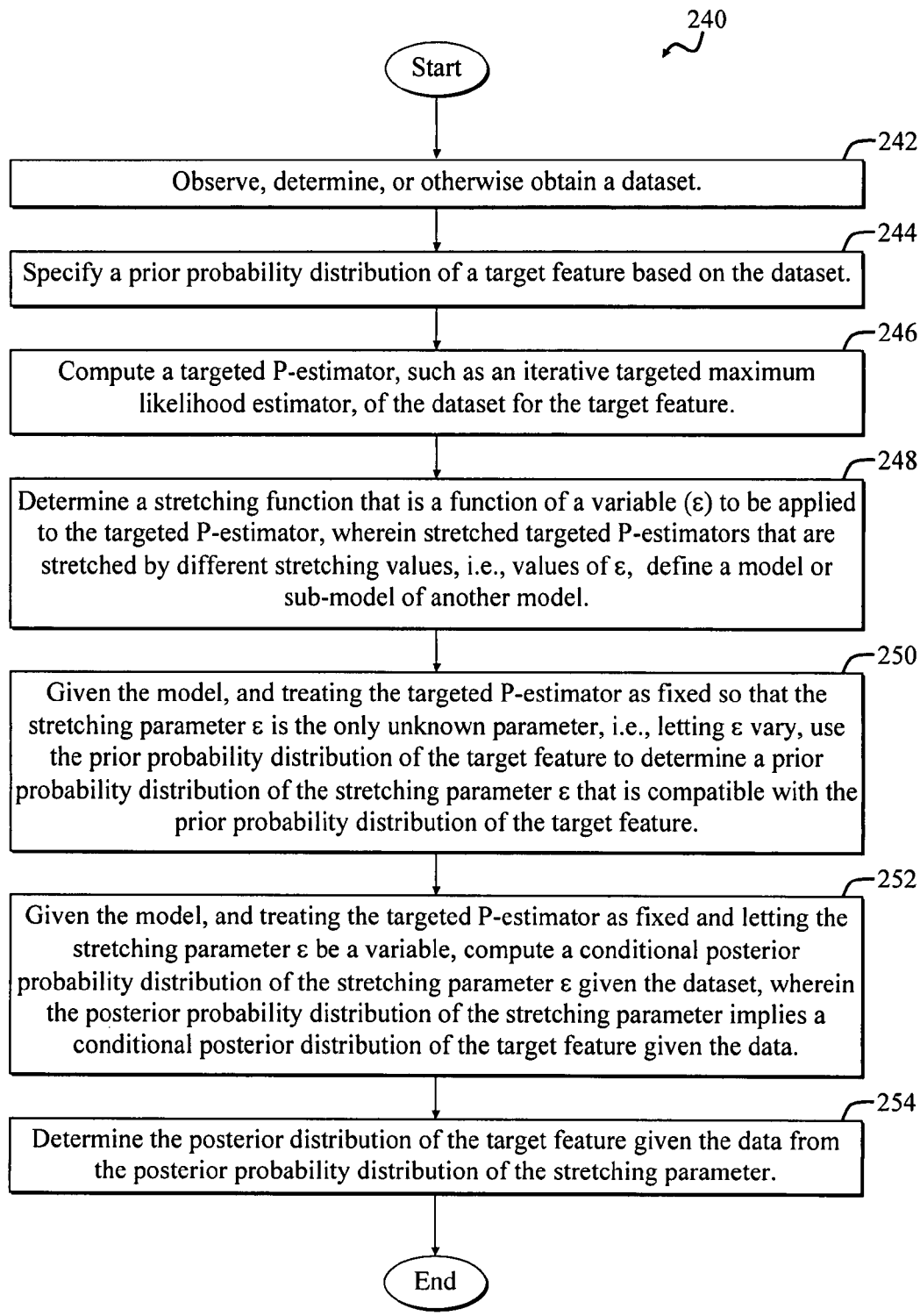
FIG. 11 is a flow diagram of a second example method for implementing a targeted Bayesian maximum likelihood process.

FIG. 11 is a flow diagram of a more detailed second method 240 for implementing a targeted Bayesian maximum likelihood process.

The second method 240 includes a data-obtaining step 242, which includes observing, determining, or otherwise obtaining a dataset, also called the data.

A subsequent target-feature-determining step 244 includes specifying a prior probability distribution of a target feature given the dataset. For the purposes of the present discussion, the probability distribution of the target feature is denoted $P_\psi$, where $\psi$ represents a parameter representative of the target feature.

A subsequent estimator-determining step 246 includes computing a targeted P-estimator $\hat{P}^*$, such as an iterative targeted maximum likelihood estimator, of the dataset. The targeted P-estimator $\hat{P}^*$ is targeted for the target feature $\psi$.

The targeted estimator $\hat{P}^*$, also called a frequentist estimator, represents an estimated probability distribution in a first model, wherein the first model is denoted M. The first model M includes all probability distributions employed in the present method. While in the present specific embodiment, a targeted estimator is employed, those skilled in the art will appreciate that the estimator can be un-targeted without departing from the scope of the present teachings.

Next, an $\epsilon$-determining step 248 includes determining an optimal stretching function that is a function of a variable ($\epsilon$) to be applied to the targeted P-estimator $\hat{P}^*$ determined in the estimator-determining step 246. Note that this fluctuation function of $\epsilon$ represents an additional or different function that used to obtain the targeted P-estimator $\hat{P}^*$ from an initial estimator $\hat{P}$ of a distribution of a dataset. However, this fluctuation function may take on a similar or equivalent form as the stretching function used to determine the targeted P-estimator $\hat{P}^*$ from the initial estimator $\hat{P}$. Furthermore, note that the initial estimator $\hat{P}$ of the distribution of the dataset is not to be confused with the prior distribution $P_\psi$ of the target feature.

The fluctuation function of $\epsilon$ is applied to the targeted P-estimator $\hat{P}^*$. Treating $\hat{P}^*$ fixed and letting $\epsilon$ vary yields a set of stretched targeted estimators. The resulting set of targeted P-estimators $\hat{P}^*$ indexed by different values of the stretching parameter $\epsilon$ represents a sub-model (m) of the model M. The stretched targeted P-estimators $\hat{P}^*$ are considered conditional probability distributions of the dataset given (conditional upon) different values of the stretching parameter $\epsilon$. Hence, each targeted P-estimator $\hat{P}^*(\epsilon)$ in the sub-model m is a stretched conditional probability distribution of the dataset given the choice of $\epsilon$ used to stretch the targeted P-estimator $\hat{P}^*$. The sub-model m is defined as a sub-model of the model M, such that $$m = \{\hat{P}^*(\epsilon): \epsilon\} \subset M. \quad [8]$$

The fluctuation function of $\epsilon$ is chosen so that when $\epsilon=0$, the targeted estimator $\hat{P}^*$ is obtained. The fluctuation function is said to not stretch the targeted estimator $\hat{P}^*$ when $\epsilon=0$. In addition, the set of, i.e., the span of the scores of the parameter $\epsilon$ at zero includes the components of an efficient influence curve at the targeted estimator $\hat{P}^*$. In addition, the targeted estimator $\hat{P}^*$ solves an efficient influence curve equation when substituted therein. The fluctuation function of the parameter $\epsilon$ is said to be a fluctuation through $\hat{P}^*$ at $\epsilon=0$ with a score at $\epsilon=0$ equal to an efficient influence curve $D(\hat{P}^*)$ at $\epsilon=0$.

A subsequent prior-$\epsilon$-distribution determining step 250 includes, given the sub-model m, treating the targeted P-estimator $\hat{P}^*$ as fixed so that the stretching parameter $\epsilon$ is the only unknown parameter and using the prior probability distribution $P_\psi$ of the target feature to determine a prior probability distribution ($P_\epsilon$) of the stretching parameter $\epsilon$. $P_\epsilon$ is compatible with the prior probability distribution $P_\psi$ of the target feature, so that $P_\psi$ corresponds to the distribution of targeted feature values $\Psi(\hat{P}^*(\epsilon))$, where $\Psi$ is a feature map used to determine values for the target feature of a probability distribution $\hat{P}^*(\epsilon)$, and $\epsilon$ follows the distribution $P_\epsilon$.

The prior distribution $P_\epsilon$ of $\epsilon$ implies the prior probability distribution $P_\psi$ of the target feature. This prior distribution $P_\epsilon$ implied distribution of target features must correspond to the user-supplied prior distribution $P_\psi$ of the target feature. Note that an $\epsilon$ value is mapped into a target feature value through a mapping function $f$:

$$f(\hat{P}^*): \epsilon \to \Psi(\hat{P}^*(\epsilon)) \quad [9]$$

Consequently, according to this mapping $f$, a prior distribution of $\epsilon$ implies a probability distribution of the target feature, where the prior distribution $P_\epsilon$ of $\epsilon$ is chosen so that the implied probability distribution of the target feature equals the user-supplied target feature distribution $P_\psi$.

Hence, the $\epsilon$-distribution determining step 250 involves determining a prior distribution $P_\epsilon$ of $\epsilon$, which implies for the sub-model m the specified prior probability distribution $P_\psi$ of the target feature.

Next, a posterior-$\epsilon$-distribution determining step 252 includes, given the sub-model m, computing the posterior conditional probability distribution of the stretching parameter $\epsilon$ given the dataset, while treating the targeted P-estimator $\hat{P}^*$ as fixed (non-random) and $\epsilon$ as a random variable with probability distribution $P_\epsilon$. The posterior conditional probability distribution of the stretching parameter $\epsilon$ given the dataset is also simply called the poster distribution of $\epsilon$ and is denoted $P_{\epsilon,posterior}$. $P_{\epsilon,posterior}$ implies also the posterior conditional probability distribution of the target feature given the dataset through the specified mapping $f(\hat{P}^*)$ in formula (9). The posterior conditional probability distribution of the target feature given the dataset is also simply called the posterior distribution of $\psi$ and is denoted $P_{\psi,posterior}$.

Given a dataset $\{O_1, \ldots, O_n\}$, the conditional density of $\{O_1, \ldots, O_n\}$ given $\epsilon$ is given by:

$$\prod_{i=1}^{n} d\hat{P}^*(\epsilon)(O_i),$$

which can then be used in Bayes formula (e.g.

$$\prod_{i=1}^{n} d\hat{P}^*(\varepsilon)(O_i)\eta,$$

where $\eta$ is a particular function of $f(\hat{P}^*)$, $\epsilon$, the prior distribution $P_\psi$ of the target feature, and the Jacobian corresponding to the transformation $\psi=f(\hat{P}^*)(\epsilon)$, $\eta$ representing the prior distribution $P_\epsilon$ of $\epsilon$, which is compatible with the prior distribution $P_\psi$ of target feature) to determine $P_{\epsilon,posterior}$, which is a conditional distribution of $\epsilon$ given $\{O_1, \ldots, O_n\}$. Note that a distribution $\hat{P}^*(\epsilon)$ in the sub-model m is treated as a conditional probability distribution of the data given $\epsilon$.

A subsequent posterior-$\psi$-distribution determining step 254 involves mapping the posterior distribution $P_{\epsilon,posterior}$ of the parameter $\epsilon$ given the dataset into the posterior distribution $P_{\psi,posterior}$ of the target feature, represented by $f(\hat{P}^*)$ as in formula (9), given the dataset, while treating the targeted estimator $\hat{P}^*$ as non-random.

Although a process or module or device of embodiments disclosed herein may be presented as a single entity, such as software executing on a single machine, such software and/or modules can readily be executed on multiple machines in hardware and/or software. Furthermore, multiple different modules and/or programs of embodiments of the present invention may be implemented on one or more machines without departing from the scope thereof.

Any suitable programming language can be used to implement the routines or other instructions employed by various modules or entities. Exemplary programming languages include C, C++, Matlab, Mathematica, R, S-plus, PHP, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed simultaneously in parallel, such as via pipelined processing or via parallel processors or engines.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A module or processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an example embodiment", or "a specific embodiment" means that a particular feature, structure, or characteristic described in connection with the embodiment is included in an embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for obtaining an estimator comprising: determining data;
determining an initial estimator descriptive of a first distribution of the data;
determining a target feature pertaining to the data; and
selectively modifying the initial estimator based on the target feature to determine a modified estimator, the modified estimator providing a second distribution of the data, wherein selectively modifying includes iteratively updating the modified estimator by using a previously determined modified estimator to provide the initial estimator for a subsequent iteration.

2. The method of claim 1, wherein selectively modifying includes:
applying an epsilon function to the initial estimator to yield the modified estimator.

3. The method of claim 2 further including:
selecting a value of a parameter ($\epsilon$) by maximizing or minimizing or increasing or decreasing one or more empirical criteria, wherein the epsilon function is a function of a stretching parameter $\epsilon$.

4. The method of claim 2, wherein the epsilon function includes:
a function of a stretching parameter $\epsilon$ such that the initial estimator fluctuates or changes as a function of the parameter $\epsilon$ when the epsilon function is applied to the initial estimator.

5. The method of claim 4, wherein when the parameter ($\epsilon$) is set to zero, the initial estimator is not fluctuated.

6. The method of claim 5, wherein a linear span of a derivative of the one or more empirical criteria as a function of the stretching parameter $\epsilon$ at $\epsilon=0$ includes components of a predetermined function.

7. The method of claim 1, wherein iteratively updating includes:
reducing asymptotic bias for the target feature in each iteration of the updating of the modified estimator.

8. The method of claim 1, wherein iteratively updating further includes:
creating a sub-model of stretched versions of the initial estimator, wherein the stretched versions have been stretched by an epsilon function; and
using the sub-model to select a value for a parameter ($\epsilon$) of the epsilon function based on a criterion; and
repeating the above steps with each updating of said step of iteratively updating.

9. The method of claim 1, further including:
using the modified estimator and a stretching function to map a prior probability distribution of a target feature to a posterior distribution of the target feature.

10. The method of claim 1, wherein the modified estimator solves or approximately solves an equation by:

$$0=F(P)(O(1), \ldots, O(n)),$$

where F(P) is a function of the probability distribution P; where P represents the modified estimator, and where O(n) represents an n-th observation, where n is an integer, and where F(P)(O(1), ..., O(n)) represents F(P) applied to observations O(1), ..., O(n).

11. The method of claim 1, wherein the modified estimator solves or approximately solves an equation given by:

$$0=D(P)(O(1))+ \ldots +D(P)(O(n)),$$

where D(P) is an efficient influence curve equation evaluated P; where P represents the modified estimator; and where O(n) represents an n-th observation, where n is an integer; and where D(P)(O(n)) represents D(P) applied to an observation O(n).

12. A method for obtaining an estimator comprising: determining data;
determining an initial estimator descriptive of a first distribution of the data;
determining a target feature pertaining to the data;
selectively modifying the initial estimator based on the target feature to determine a modified estimator, the modified estimator providing a second distribution of the data; and
determining multiple modified estimators from multiple initial estimators.

13. The method of claim 12, further including:
comparing one or more criteria using likelihood values for the multiple modified estimators to determine a desired modified estimator.

14. A system configured to obtain an estimator of a distribution pertaining to data comprising:
an initial estimator module configured to receive data and a target feature pertaining to the data, wherein the initial estimator module is configured to determine an initial estimator descriptive of a first distribution of the data; and
a targeted estimator module coupled to the initial estimator module and configured to selectively modify the initial estimator based on the target feature to determine a modified estimator, the modified estimator providing a second distribution of the data, wherein the targeted estimator module is configured to provide a targeted estimator usable to yield an improved estimator of a particular feature relative to an estimate of the feature that would be provided via an initial estimator provided by the initial estimator module.

15. The system of claim 14, wherein the targeted estimator module is configured to remove asymptotic bias for the target feature from an initial estimator output by the initial estimator module and provide a targeted estimator as output in response thereto.

16. The system of claim 14, further including a targeted feature calculation module coupled to the targeted estimator module, wherein the targeted feature calculation module is adapted to apply a mapping function based on the target information sought to a targeted estimator output by the targeted estimator module.

17. Software encoded in one or more tangible media for non-transitory computer-readable medium execution by the one or more processors and when executed operable to: determine data; determine a target feature pertaining to the data; determine an initial estimator descriptive of a first distribution of the data; and selectively modify the initial estimator based on the target feature to determine a modified estimator, the modified estimator providing a second distribution of the data, wherein selectively modifying includes iteratively updating the modified estimator by using a previously determined modified estimator to provide the initial estimator for a subsequent iteration.

18. A method comprising:

obtaining a dataset; and mapping a prior probability distribution of a target feature to a posterior distribution of the target feature using an estimator of a probability distribution of the dataset and a stretching function.

19. The method of claim 18, wherein mapping includes:

calculating the posterior distribution of the target feature using a sub-model of one or more stretched probability distributions obtained by stretching one or more probability distributions of the dataset with the stretching function.

20. The method of claim 19, further including:

determining the stretched targeted estimators by treating a targeted estimator, which represents the estimator of the probability distribution of the dataset, as fixed or non-random and letting a stretching parameter ($\epsilon$) of the stretching function vary to determine the posterior distribution of the target feature given the dataset.

21. The method of claim 18, wherein mapping further includes:

calculating the posterior distribution of the target feature by first calculating a posterior distribution of a parameter ($\epsilon$) of the stretching function, given the data set, from a prior distribution of the parameter $\epsilon$.

22. The method of claim 18, wherein mapping further includes:

determining the estimator of a probability distribution of the dataset, wherein the estimator of a probability distribution of the dataset includes a targeted estimator that is targeted based on the target feature.

23. The method of claim 22, wherein the targeted estimator solves or approximately solves an efficient influence curve equation or other estimating equation.

24. The method of claim 22, wherein mapping further includes:

determining the stretching function, wherein the stretching function is a function of a variable parameter ($\epsilon$) such that when $\epsilon=0$, the targeted estimator to which the stretching function is applied is not stretched.

25. The method of claim 24, wherein mapping further includes:

determining a sub-model that includes targeted probability distributions of the dataset indexed by different values of the variable parameter ($\epsilon$), wherein the targeted probability distributions are treated as non-random.

26. The method of claim 25, wherein determining a sub-model further includes:

treating the stretched targeted probability distributions as conditional probability distributions of the dataset given choices of the parameter $\epsilon$.

27. The method of claim 26, wherein mapping further includes:

determining a prior distribution of the parameter $\epsilon$ that implies, for the sub-model, the prior probability distribution of the target feature.

28. The method of claim 27, wherein mapping further includes:

using the sub-model and the prior probability distribution of the parameter $\epsilon$ to determine the posterior distribution of the target feature given the dataset.

* * * * *